(12) United States Patent
Gurin et al.

(10) Patent No.: US 10,099,598 B2
(45) Date of Patent: Oct. 16, 2018

(54) RECONFIGURABLE SHARED USE VEHICLE

(71) Applicants: Michael H Gurin, Glenview, IL (US); Ilana Green Cember, Evanston, IL (US)

(72) Inventors: Michael H Gurin, Glenview, IL (US); Ilana Green Cember, Evanston, IL (US)

( * ) Notice: Subject to any disclaimer, the term of this patent is extended or adjusted under 35 U.S.C. 154(b) by 3 days.

(21) Appl. No.: 15/395,396

(22) Filed: Dec. 30, 2016

(65) Prior Publication Data
US 2018/0186274 A1    Jul. 5, 2018

(51) Int. Cl.
*B60P 3/42*   (2006.01)
*B62D 47/00*   (2006.01)
*B62D 63/02*   (2006.01)

(52) U.S. Cl.
CPC ............ *B60P 3/423* (2013.01); *B62D 47/003* (2013.01); *B62D 63/025* (2013.01)

(58) Field of Classification Search
CPC ...... B60P 3/423; B62D 47/003; B62D 63/025
See application file for complete search history.

(56) References Cited

U.S. PATENT DOCUMENTS

| | | | |
|---|---|---|---|
| 2013/0033055 A1* | 2/2013 | Surridge | B60P 3/423 296/10 |
| 2017/0203801 A1* | 7/2017 | Hung | B62D 63/025 |
| 2018/0005169 A1* | 1/2018 | High | G06Q 10/083 |

* cited by examiner

*Primary Examiner* — D Glenn Dayoan
*Assistant Examiner* — Melissa A Black

(57) ABSTRACT

The present invention is a multi-use dynamically reconfigurable vehicle, used for vehicle/ride sharing with integral yet reconfigurable for optimal passenger or courier service by reconfiguring the vehicle interior space and/or body shape specific to the vehicle service to create additional space respectively for the transport of passengers or cargo/boxes. The vehicle is particularly adept at reconfiguration with compatibility of an external automated process to load/unload its cargo while also enabling a high aerodynamic efficiency while in a driving mode.

12 Claims, 28 Drawing Sheets

Configurable car 1 in passsenger driving mode

Configurable car 1 in passenger driving mode
Car body 2

Dashboard 12   Wheels 13

Configurable car 1 in passsenger driving mode

Configurable car 1 in pasenger loading mode

Configurable car 1 in passenger loading mode

Configurable car 1 in uneven loading mode

Configurable car 1 in shortened collapsed mode

Configurable car 1 in passenger driving mode

Configurable car 1 in loading mode

Configurable car 1 in collapsed mode

Configurable car 1 showing all three modes with actuators 11

Configurable car 1 in courier loading mode

Configurable car 1 in courier driving mode

Configurable car 1 in courier collapsed driving mode

Configurable car 1 in courier loading mode

Configurable car 1 in courier driving mode

Configurable car 1 in courier loading mode

Configurable car 1 in courier driving mode

Configurable car 1 in courier loading mode

Configurable car 1 in courier driving mode

Configurable car 1 in passenger driving mode

Configurable car 1 in courier driving mode

Configurable car 1 in dual seat mode

Configurable car 1 in dual seat mode

Side View

Front View

RECONFIGURABLE SHARED USE VEHICLE

FIELD OF INVENTION

The present invention relates to the transportation industry, particularly for multi-use (including and particularly shared use) vehicles which are used for carrying passengers, packages, or both and are autonomously or non-autonomously operated.

BACKGROUND OF INVENTION

Prior art focuses on optimizing automobile seats for passenger use without exploring designs that account for other applications for different embodiments. The present invention explores dynamic opportunities when the automobile seats (used interchangeably with chairs) are designed for a secondary application of structural and guidance support for the containerized storage system that configurable/manipulative chairs make possible. The present invention also enables an automated process for loading and/or unloading containers (used interchangeably with packages) in standard transportation vehicles while maintaining high aerodynamic operation.

The wide scale adoption of ride sharing vehicles (including shared use vehicles) can be enhanced by also acting as an ancillary courier service (or similar), which becomes economical and encourages use particularly when loading/unloading deliveries is an automated process that requires no additional effort from the driver or passenger (e.g., physically putting boxes into the trunk). It is known to those in the art existing processes for organizing the "optimal" (depending on prioritizations) route for multiple stops, but nothing includes use of automated loading/unloading systems to encourage further adoption due to ease of use or space that can act as either seating or package area depending on required use. The present invention includes multiple embodiments depending on the prioritizations of the user.

SUMMARY OF INVENTION

The present invention is a system of configurable components, particularly the fuselage, passenger seats, and entirety of the trunk area for a vehicle used as for ride sharing, shared use and/or courier service. The ability to reconfigure the vehicle enables high vehicle utilization factor, that ultimately drives the economics of vehicle operations.

DEFINITIONS

Figure 1A:
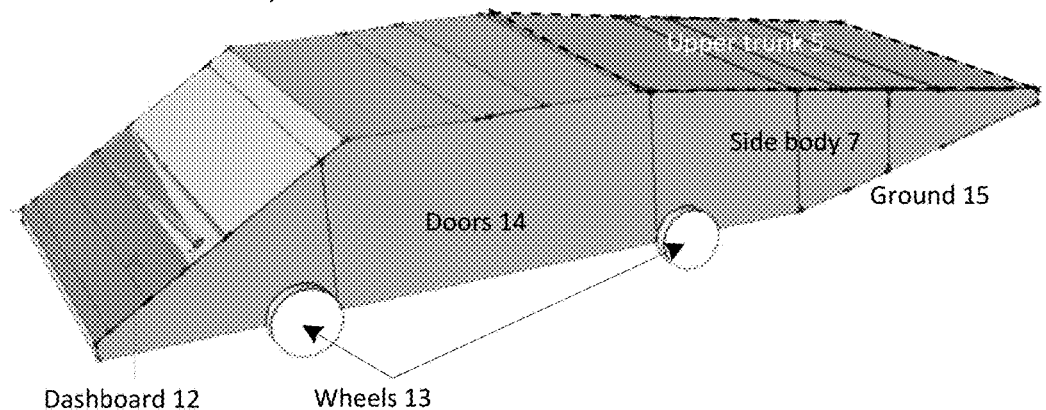
FIG. 1A is an illustration of the present invention in passenger extended driving mode.

The term "autonomous" refers to a vehicle which drives without input from a person, i.e., is driven by any embodiment of a computer (i.e., artificial intelligence, used interchangeably with "A.I."). as known in the art. In the present invention, autonomous mode may not require human presence within the vehicle for driving or may use remote control/access. This mode minimizes or eliminates the need for a dashboard, which may increase the space available in courier mode. The term "non-autonomous" refers to a vehicle which primarily requires a human driver control, with or without computer/A.I. assistance (such as blind-spot alerts or parking assist as known in the art). These modes are mutually exclusive with each other.

The term "passenger mode" refers to an operation mode which includes the transportation of people. This requires at least one of the seats 3 or 4 in a mode which allows a person to safely sit within the car. This mode may still include transportation of packages 20. Passenger and courier modes are not mutually exclusive with autonomous and non-autonomous mode, but are mutually exclusive with each other for specific seats. For example, autonomous passenger mode would include a human or non-autonomous (e.g., small child or pet) passenger but would not require any human input for control. Non-autonomous courier mode would include, for example, at least one front seat 3 in passenger mode (i.e., can safely hold a driver) but the rear seats are in courier mode.

The term "courier mode" refers to operation mode which primarily includes transportation of packages 20. Courier mode includes at least one of the rear seats 4 (if there is more than one rather than the bench-style seating shown in some figures) manipulated to transfer some space from passenger cabin 22 into trunk space 21 (i.e., can hold packages rather than passengers). The trunk 5 may be in any position (i.e., extended, collapsed, or shortened) during courier or passenger mode.

The term "package," used interchangeably with "box" and "container," refers to any object which could contain any number of items and is preferably storage vessel of standardized sizes. They may or may not be locked to each other on any side and may or may not be stackable on top of each other.

The phrase "car body" is used interchangeably with "car frame" or "car chassis" and is the main supporting structure/framework of the vehicle which all other components are attached, comparable to the skeleton of an organism. It is known to those in the art that current vehicles mostly use a unibody design, wherein the underpart and bodywork have been integrated, such that the shape of the car chassis is indistinguishable from the rest of the car.

DETAILED DESCRIPTION OF INVENTION

Here, as well as elsewhere in the specification and claims, individual numerical values and/or individual range limits can be combined to form non-disclosed ranges.

Exemplary embodiments of the present invention are provided with reference to the contained figures. Such embodiments are merely exemplary in nature. With regard to the figures, like reference numerals refer to like parts.

FIG. 1A introduces the first embodiment of the present invention with an isometric view of the outside of the configurable car 1 without any cutaway/transparent views and with ground 15 for reference. Car 1 refers to the entire vehicle with all components. Car body 2 refers to the structural components of car 1 as previously defined. Ground 15 is the entire surface underneath car 1, indicated by the double lines. The general shape of the car body 2 is that which is preferably highly aerodynamic, while concurrently enabling easy access for transfer into and/or removal of packages from the trunk, as known in the art. Based on the specific priorities or requirements, changes such as the upper trunk 5 and/or lower trunk 6 being more horizontal when in extended driving mode would increase the space for packages 20 in the trunk space 21, such as shown in FIG. 13. Upper trunk 5 is outlined with the dotted line. Doors 14 are in the same location as current cars in the art, between wheels 13 and with a height which enables people to easily exit the car 1. Side body 7 connects the upper trunk 5 with the lower trunk 6. Side body 7 is outlined with the dotted line in FIG. 1B. The dashboard 12 is identical to different embodiments known in the art; for example, a minimal dashboard with primarily "heads up" display, full dashboard for completely non-autonomous driving, or minimal dashboard for primarily or completely autonomous driving. A minimal or eliminated dashboard 12 decreases the amount of space required in the passenger cabin 22, thereby increasing the amount of space available for packages 20 and trunk space 21 within the same total car 1 volume. It is a fundamental objective of the invention to maximize the ability to move the dashboard into a "stowed" position to enable packages to be transported into and/or removed from the front portion of the car body.

Figure 1B:
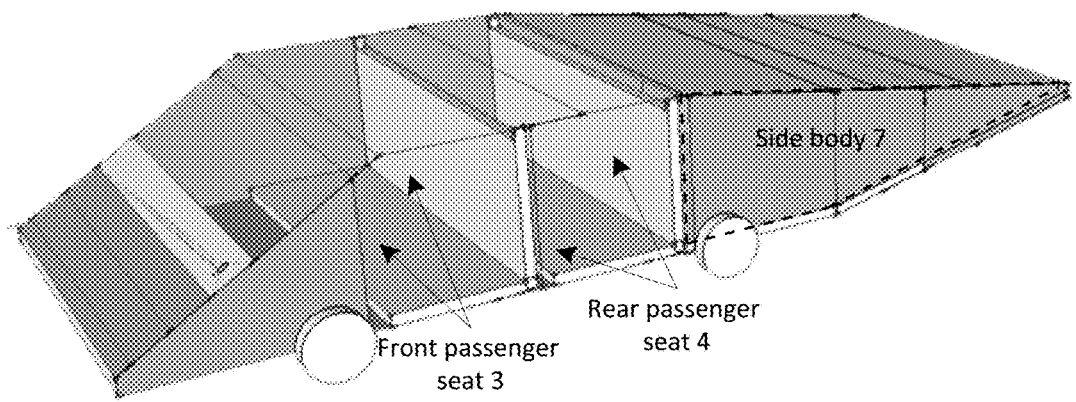
FIG. 1B is an illustration of the present invention in passenger, extended driving mode with transparent sections along the doors and the top of the car.
Figure 1C:
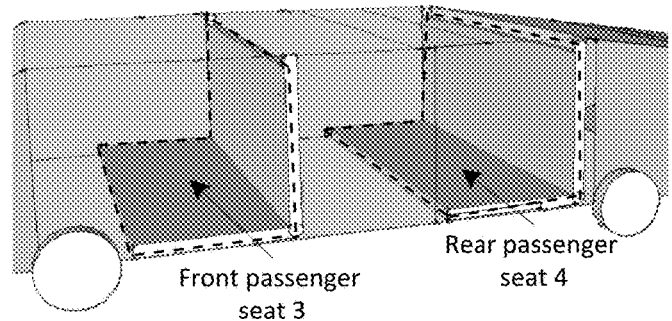
FIG. 1C is an illustration of the present invention with increased space for legroom of the passenger seats.

FIG. 1B is identical to portion 1A except that it shows a transparent view of the front passenger seat (also referred to as "front seat") 3 and rear passenger seat (also referred to as "rear seat") 4. Each front seat 3 and rear seat 4 includes both sections as shown. They are also outlined by the dotted lines in FIG. 1C and they are shown in detail in FIG. 3B. In this embodiment, the space behind the rear seat 4 is trunk space 21 when in passenger or courier extended driving mode. Other embodiments are shown in subsequent drawings. FIG. 1C is identical to FIG. 1B except that it shows additional passenger space (e.g., for leg room) between front seat 3 and rear seat 4. All embodiments in subsequent figures are identical when applied to the embodiment shown in portion 1C. It is a fundamental object of the invention to enable at least one of the front and/or rear seats to be stowed (i.e., stowable) in an upward manner (i.e., towards the upper car body "panel", also referred to as the upper car trunk when that panel is not in the traditional rear panel where packages or boxes (a.k.a. cargo) is stored within the vehicle. It is recognized that the physical space within the upper body panels and the bottom body panels is collectively referred to as the interior space of the vehicle. The interior space of the vehicle is utilized to transport passengers (inclusive of driver) and cargo (e.g., packages, boxes, etc., preferably in an industry standardized container size). Thus it is a fundamental object of the invention to alter between the interior space maximizing passenger occupancy space or cargo occupancy space.

Figure 2A:
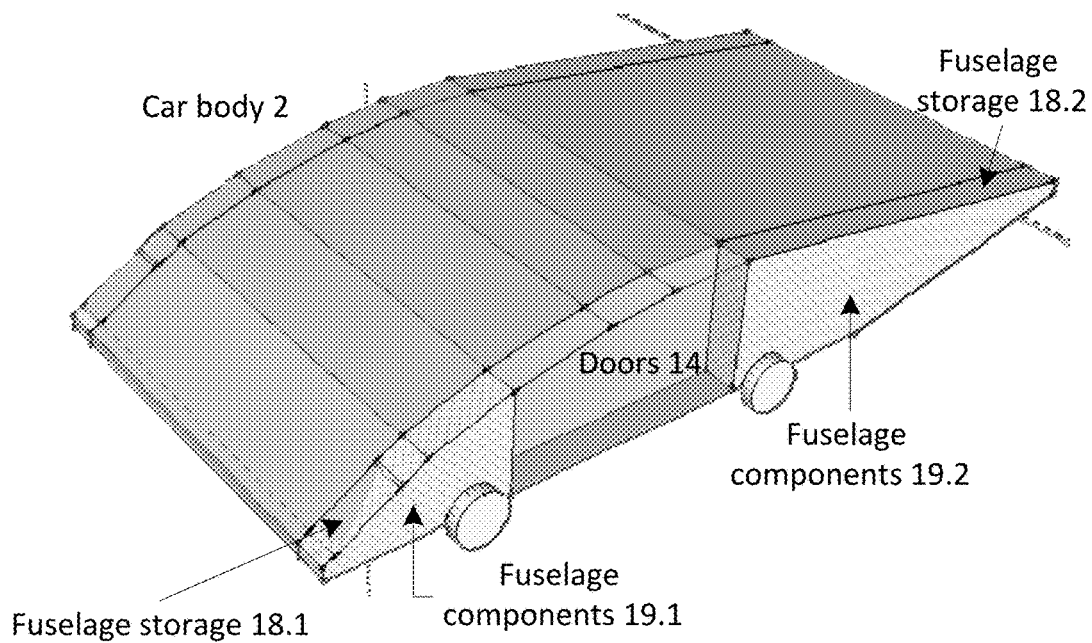
FIG. 2A is an illustration of the present invention with fuselage storage along the outer edges of the entire car.
Figure 2B:
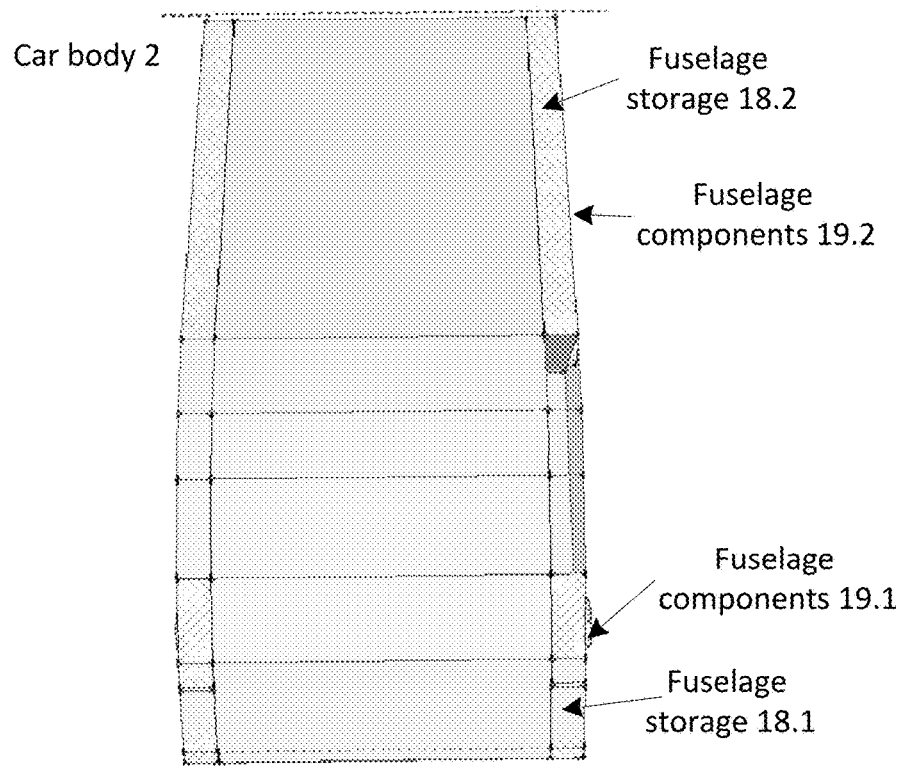
FIG. 2B is an illustration of the present invention with fuselage storage along the outer edges of the entire car.

FIGS. 2A and 2B illustrate another embodiment of the present invention. FIG. 2A is an isometric view and FIG. 2B is a top view of the same embodiment. Currently in the art in an internal combustion engine ("ICE") or hybrid vehicle, automobile components, such as the engine, battery, transmission, and HVAC system, are located most often in the front (hood) of or underneath the vehicle 1. The aforementioned automobile components are collectively and individually referred to as primary vehicle component(s). In an electric vehicle, most of the components (primarily batteries) are located underneath the car 1. Particularly in ICE vehicles, this uses up significant space. When focusing on multi-use cars (i.e., ride sharing and courier service), this additional space reduces its utility and economic advantage. It is well understood that the amortization rate of capital is attributed to the utilization factor of the capital asset. Due to the ebb and flow of vehicle demand largely tied to personal travel, as recognized by the term rush hour, it is essential for the multi-use vehicle to be very effective in cargo transportation. Cargo transportation, herein referencing packages/containers that includes items owned by the driver, passenger, ride-sharer, or a $3^{rd}$ party (business or person) not at all affiliated with the multi-use vehicle. Cargo transportation when owned by either the driver or passenger must be rapidly moved into or removed from the vehicle which also requires easy access for loading and unloading. Further, it is significantly easier to have precise alignment (within at least 5 inches, preferably within at least 2 inches, and particularly preferred within at least 0.5 inches) as guided by the vehicle driver into the cargo loading/unloading mechanism (as known in the art, particularly relevant is container loading/unloading on commercial/cargo airplanes) when the vehicle is being driven forward rather than backward. Therefore, it is particularly important for cargo frontal access in addition to increased cargo area (preferably that reconfigures from rush hour to non-rush hour varying demands of high passenger loading to high cargo loading respectively. This requires components, hereinafter collectively referred to as fuselage components 19.1 and 19.2 when physically placed in the fuselage storage 18.1 and 18.2, including engine, HVAC, energy storage, etc. to be located (from their traditional front hood position) to the side fuselage storage 18.1 and 18.2. Components (e.g., engine, HVAC, energy storage, etc.) not able to be placed into fuselage storage are referred to as non-fuselage components (110 FIGS. 25 and 26). Maximizing space for the courier service while maintaining functionality for passengers (or driver in non-autonomous vehicles) has one embodiment where preferably all automobile primary components 19.1 and 19.2 are moved to the sides (i.e., exterior facing vehicle panels) of the car 1 in fuselage storage 18.1 and 18.2. As shown in FIGS. 2A and 2B, fuselage storage 18.1 and 18.2 hold fuselage components 19.1 and 19.2. As obvious to those in the art, fuselage storage 19 must not interfere with doors 14 or other accessible locations. Moving all automobile components 19 to the sides provides full access to storage space from the front to back, for example as shown in FIG. 9. Air intake on the top or front of storage 18.1 and 18.2 as known in the art may increase cooling flow to any car component or overall aerodynamics.

Figure 3A:
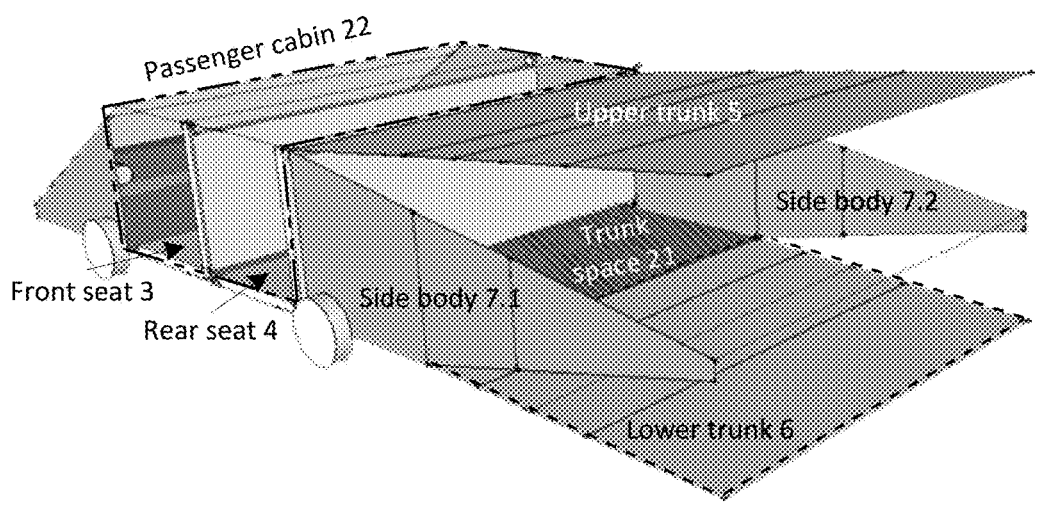
FIG. 3A is an illustration of the present invention in loading mode for access to the trunk space.
Figure 3B:
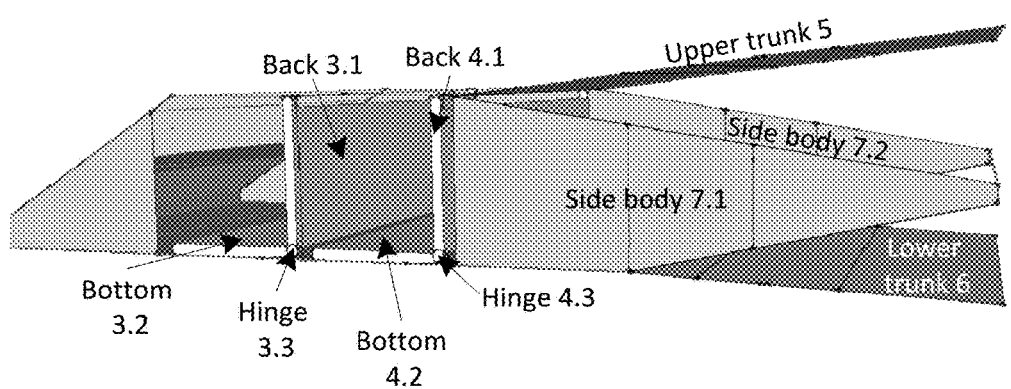
FIG. 3B is an illustration of the present invention in loading mode for access to the trunk space.

FIGS. 3A and 3B illustrate the present invention in loading mode (used interchangeably with unloading mode, since they are functionally the same except for the direction in which the boxes 20 move in or out of the car 1) while still also in passenger mode as reflected by the passenger occupying seat positions of the front seat 3 and rear seat 4. FIGS. 3A and 3B are identical but from different viewpoints. Front seat 3 and rear seat 4, which are located inside the passenger cabin 22, remain the same as in FIGS. 1A, 1B, and 1C. Passenger cabin 22 is outlined with the dotted line around the clearly marked seats. Upper trunk 5 is raised up and the lower trunk 6 is lowered for trunk loading/unloading into the "rear" trunk space 21. The lower trunk 6 is visible and is also outlined by the dotted line (adjoining of the trunk space 21) while the trunk space 21 is indicated by the diagonal line coverage. In this embodiment, side body 7.1 and 7.2 are shown in their stationary car driving mode. Side body 7.1 and 7.2 are identical in function, though mirror opposite in the direction of their respective movements but on opposite sides of the car 1. The package 20 sizes can be any size that allows the upper trunk 5 and lower trunk 6 to completely closed, i.e., return to the same driving mode as shown. The preferred size of the package height is such that twice the package height is less than (by at least 1 inch) the car height (which is the distance between the lower trunk 6 and the upper trunk 5 at the rear most position of the trunk space 21. The width of the package can also be any width, but preferred to be such that at least two packages can be placed side by side (i.e., less than half the distance between side body 7.1 and 7.2 while accounting for any adjoining fuselage storage components (not shown in this figure) width. Another feature, though also not shown in this figure, is a linkage between the package and the lower trunk 6 (and also trunk space, as well as preferably throughout the passenger cabin 22) guide track/rail (as shown in FIGS. 17 and 18).

FIG. 3B includes labels for the representative seat components already known in the art. The back of the seat 3.1 and 4.1 is attached to the bottom of the seat 3.2 and 4.2 respectively via hinges 3.3 and 4.3. Various actuators 11 (used interchangeably with the term "tracks" and particularly preferred when the actuator also serves as a guide track) are shown in subsequent figures that move the different components for each embodiment. Immobile actuators 11 are preferably structurally attached directly to the car body 2 to provide structural integrity and support. Upper courier shelves 9 are normally (i.e., driving mode) attached to hinge 4.3 or back 4.1 and are automatically raised when the rear seat 4 is moved into the courier position as shown in subsequent figures. The front 3 and rear seats 4 are shown as bench-style seating, but other embodiments include separated seating known in the art and shown in FIGS. 15A and 15B. It is understood that the front 3 and rear 4 seats can run the entire width of the passenger cabin 22, or preferably are less than half the width of the passenger cabin 22 to provide independent control of the seat position. Another benefit of the discontinuous seat is increased personal space between the left and right passengers, as a primary objective of the shared vehicle is to enable perfect strangers to feel comfortable with each other. The front 3 and rear 4 seats are shown as being from the bottom of the vehicle (corresponding to the lower trunk 6 height to the upper trunk 5) BUT it is understood that the actual seat bottoms 3.2 and 4.2 are above the lower trunk 6 and that the actual seat backs 3.1 and 4.1 are lower than the upper trunk 5. The particularly preferred seat positions are as shown in FIG. 24. It is further understood that the lower trunk 6 is depicted as a continuous straight structural element from the front of the vehicle to the rear of the vehicle, yet the invention need only have the lower trunk 6 provide for a smooth and continuous transition from the trunk space 21 to the lower trunk 6. It is further understood that though this figure shows the trunk space 21 in the rear of the vehicle, the invention also anticipates that the trunk space 21 with the relative position of lower trunk 6 can also be in the front of the vehicle.

Figures 4A, 4B:
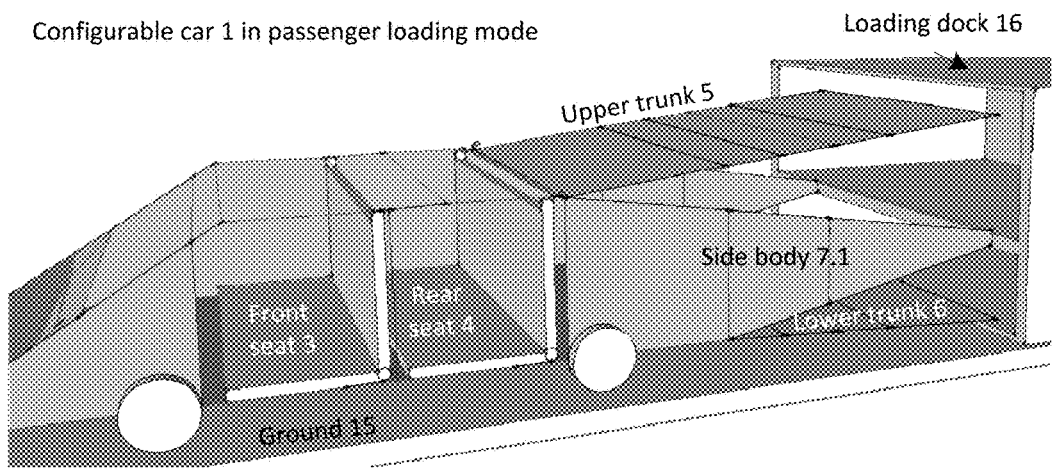
FIG. 4A is an illustration of the present invention in loading mode in physical communication with a loading dock.
FIG. 4B is an illustration of the present invention in uneven loading mode while in physical communication with a loading dock.
Figure 4C:
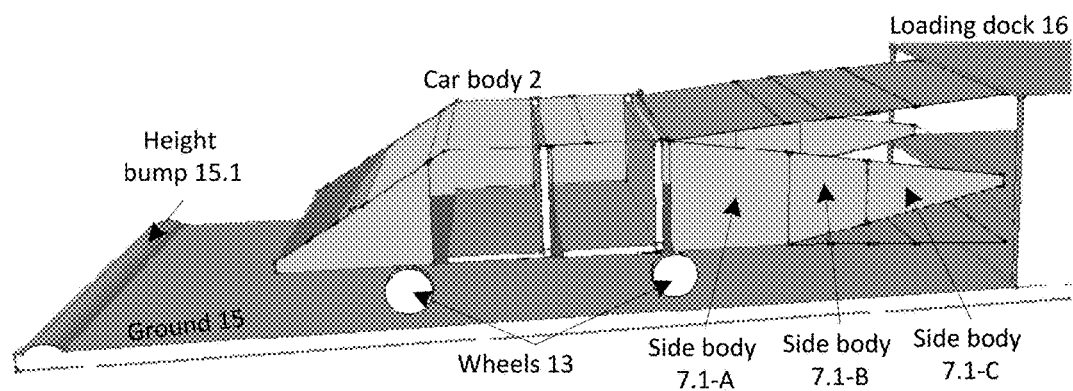

FIGS. 4A, 4B, and 4C is identical to the embodiment shown in FIGS. 3A, 3B except shown in loading/unloading mode at loading/unloading dock 16. In this embodiment, the loading dock 16 has more than one level, which enables loading for the other embodiments as shown in subsequent figures. FIG. 4B also demonstrates one embodiment for uneven loading mode, such as when either the loading dock 16 or the car 1 is not perfectly horizontal but requires adequate alignment for successful package loading/unloading, for example due to uneven ground 15, uneven loading dock 16, or uneven car 1. Trunk hinges 17.1 and 17.2 are hinges similar to those currently in the art, but with an extended total length which can provide the maximum angle expected between each edge of upper trunk 5 as shown, preferably greater than 10 degrees, specifically preferred greater than 20 degrees, and particularly preferred greater than 30 degrees. An exemplary is shown in FIG. 4B, trunk hinge 17.2 is clearly more extended than hinge 17.1 to create an angle between each side of upper trunk 5. The same embodiment applies to lower trunk 6 such that packages are easily and smoothly transferred from the lower trunk 6 position onto the proper level of the loading dock 16.

FIG. 5A demonstrates another embodiment for the uneven loading mode. A height bump 15.1, also referred to as an external vehicle height adjuster, engages a car's existing suspension system but rather than maintaining a constant height of the main car body 2 relative to the ground 15, it uses the vertical acceleration due to the height bump 15.1 to raise the entire car relative to the ground 15, as shown by the new position of wheels 13 relative to the car body 2. The height bump 15.1 itself could be uneven or the system that uses the subsequent vertical acceleration can raise each component (e.g., shock absorbers) by different amounts by varying the amount of vertical acceleration absorbed/dampened. The location of the height bump 15.1 is close enough to the loading dock 16 so that it does not provide discomfort for any passengers but far enough from the loading dock such that car 1 is moving at a speed sufficient to raise the car (which reduces the requirement for heavy duty actuators to raise the vehicle, or at least one side of the vehicle relative to the other side of the vehicle and to the ground) so that a smooth movement of packages from the lower trunk 6 to the loading dock 16 takes place. The location of the height bump 15.1 is preferably at least one car length from the loading dock, specifically preferred at least two car lengths from the loading dock, and particularly preferred at least three car lengths from the loading dock, where the car length is either the shortest, average, or longest car 1 expected to be at the loading dock 16. The angle achieved between each side of the car 1 is preferably greater than 10 degrees, specifically preferred greater than 20 degrees, and particularly preferred greater than 30 degrees. The additional height of raised car 1 is preferably one quarter the wheel 13 height, specifically preferred one half the wheel 13 height, and particularly preferred one wheel 13 height, where the height is the minimum, average, or maximum height of wheels 13 of cars 1 expected. The height adjustment system enables smooth loading/unloading of packages from the vehicle/car 1. It is an object of the invention that varying the height of the height bump 15.1, disproportionately between the left and right side of the height bump 15.1 enables the external vehicle height adjuster to concurrently alter the car body horizontal angle. It is understood that the car body horizontal angle can vary for numerous reasons including varying wear rates on wheel suspension system, varying air pressure within the tires, and of course varying road conditions relative to the horizontal orientation of the package loading/unloading ramp/dock. The only power/energy requirement for varying the height bump 15.1 is the energy required when the vehicle is not on height bump. The height and/or angle displacement required is achieved by use of an external device such as a camera taking a picture and performing a vision analysis as known in the art to determine the vehicle height and horizontal angle relative the loading dock alignment required.

Figure 5:
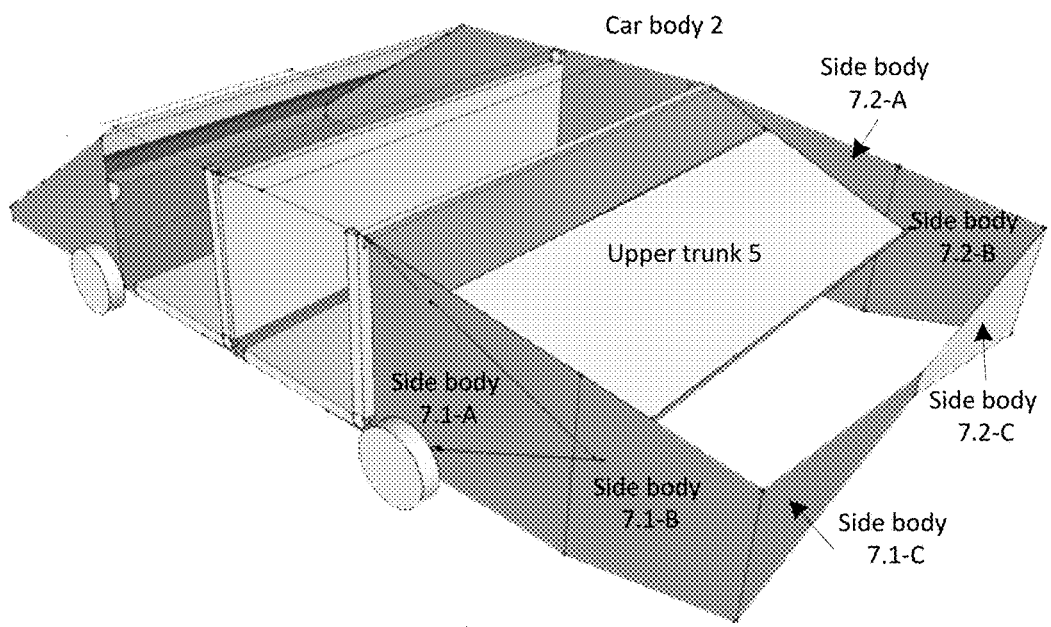
FIG. 5 is another illustration of the present invention in uneven loading mode while in physical communication with a loading dock.
Figure 7A:
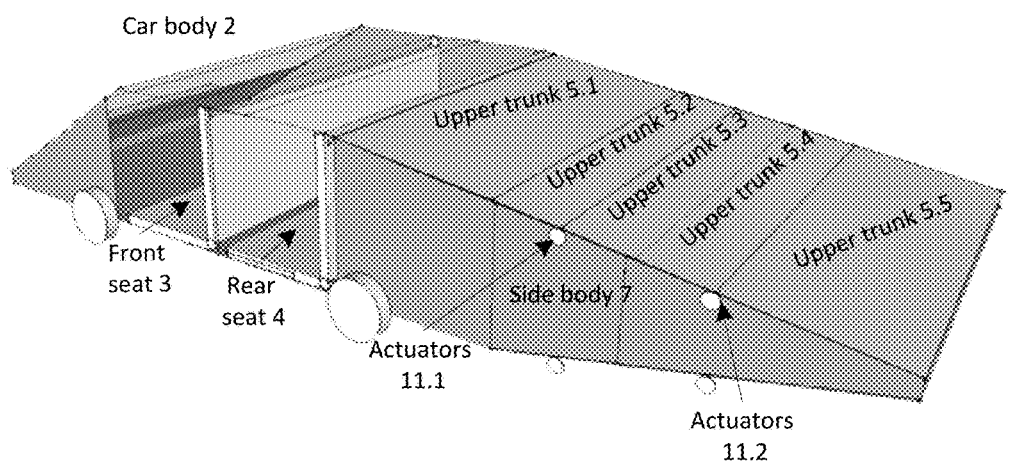
FIG. 7A is an illustration of the present invention in passenger, extended driving mode.
Figure 7B:
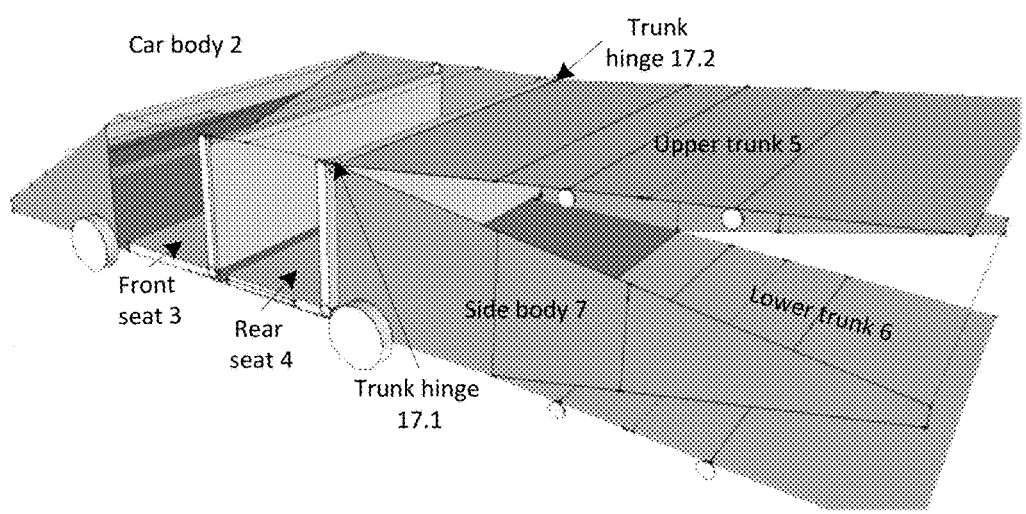
FIG. 7B is an illustration of the present invention in passenger loading mode.

FIG. 5 illustrates side body 7.1-A, 7.1-B, 7.1-C in the shortened collapsed mode as illustrated/represented by each divided segment as shown. This shortened collapsed mode is a driving mode, particularly anticipated for car usage when the maximum cargo/package space is not required, and the driving takes place in a high density urban setting (i.e., lots of traffic) such that having a shorter vehicle (e.g., parallel parking the car in a city street) outweighs the reduced energy efficiency due to the higher drag created in this shortened collapsed mode configuration. It is understood that the upper trunk 5 and lower trunk 6 are lowered/raised respectively to be flush with the side body components. The shortened mode, which refers to when the total length of car 1 is shortened due to movement of one or more sections of side body 7. This mode is particularly useful when there is a minimal or no packages in the trunk area 21 and a shortened car length is desired, such as in parking mode known in the art. In this embodiment, side body 7 is made of at least two sections, with three sections shown in FIG. 5—side bodies 7-A, 7-B, and 7-C per side and shown by each outlined segment. At least one section (e.g., 7.1-C and 7.2-C) folds in via automated hinges known in the art (not shown). The side bodies 7 which fold in may or may not interact or be in physical communication, i.e., may or may not touch or overlap. This requires collapsing of upper trunk 5 and lower trunk 6 as well, i.e., shortened mode is mutually inclusive of collapsed mode. Collapsed mode refers to the shortening of upper trunk 5 and lower trunk 6 via the process as shown in FIGS. 7C and 7D.

Figure 7C:
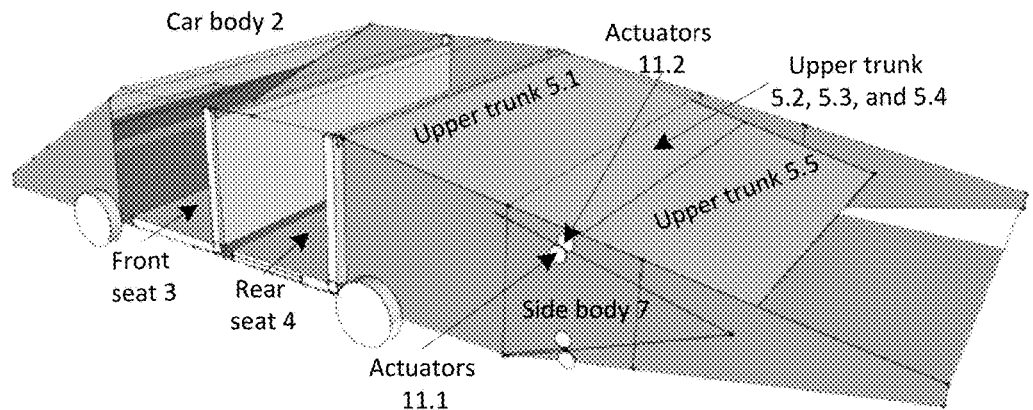
FIG. 7C is an illustration of the present invention in collapsed mode.
Figure 7D:
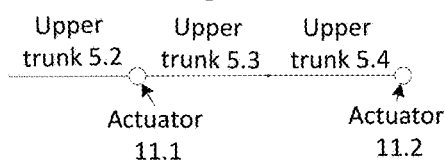
FIG. 7D is a detailed view of upper trunk sections in extended mode with actuators.

FIG. 5 illustrates a collapsed mode of the trunk space 21 further shortened as compared to that shown in FIG. 7C to further differentiate embodiments in the collapsed trunk and shortened side body 7. During implementation, the upper 5 and lower 6 trunk collapse (invisible but understood to be below and physically mating with upper 5), to the length to create a complete seal with the end of side body 7 to ensure weather-proofing and security, i.e., the shortened length of trunk 5 and 6 must be less than or equal to the shortened length of side body 7. Collapsed mode does not required shortened mode (i.e., is not mutually inclusive), but shortened mode does require collapsed mode (i.e., is mutually inclusive). Physically, shortened mode is operational without collapsed mode, but then the advantages of it (i.e., a shorter vehicle) are not realized to the full extent; it would only serve to decrease trunk space 21 yet as shown it increases the aerodynamic drag of the car 1 as shown in subsequent figures. The preferred usage of this embodiment is to minimize car 1 space requirements, such as during parking particularly when the car 1 is utilized in a shared-vehicle embodiment such that the car 1 is in close proximity to other cars as to minimize the parking lot and to maximize ease of moving the car 1 for subsequent usage amongst the other cars. This configuration further is likely prior to the car 1 receiving its cargo for the subsequent usage of the car, thus the trunk space is not required. It is understood that the containers/boxes 20 can be within the trunk space 21 such that the movement of the trunk 5 & 6 occurs following the movement of the containers/boxes 20 towards the front of the car 1. It is optional for the rear seat 4 and optionally also for the front seat 3 to reconfigure to provide space for the containers/boxes 20 since no passengers are present while the vehicle is parked. An autonomous or semi-autonomous vehicle (i.e., car 1) has the advantage of moving out of the parked spot without any passengers thus uniquely taking advantage of the parking configuration that concurrently minimizes car 1 physical space, and maximizes cargo content.

Figure 6:
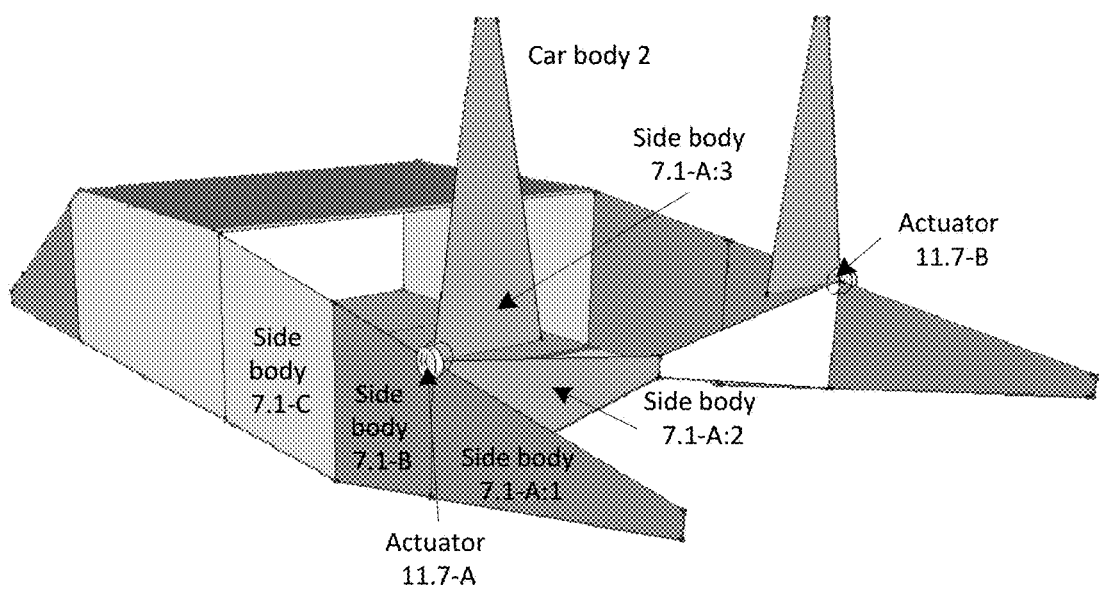
FIG. 6 is an illustration of one embodiment in shortened loading mode.

FIG. 6 shows another embodiment of the present invention in another shortened mode. This mode is similar to that shown in FIG. 5 to decrease space used when not needed, e.g., in parking mode. In this embodiment, at least one section of side body 7 (7-C shown) rotates inwards (i.e., towards the centerline of the car 2) and upwards (i.e., in the direction opposite to the ground 15), in that order or reverse order (i.e., upwards and then inwards) as illustrated by the dotted arrows. Unlike the embodiment shown in FIG. 5, this design allows a user (or automated cargo loader/unloader) to access the trunk space 21 from the outside of car 1 even if there is not enough space behind car 1 for side body 7-C (as shown in FIG. 5) to rotate into its original position (e.g., in parking mode when there is another car known in the art directly to the rear). Since the side body 7-C (which otherwise blocks access) can rotate up, this provides external access to inside the trunk space 21. Representations of actuators 11.7 are shown for the pivot points of rotation for side body 7-C. Upper trunk 5 and lower trunk 6 collapse in an identical manner to that shown in FIG. 5 to create full closure for weather-proofing and security. All of the shortened modes enable concurrent movement of the seats and cargo to dynamically and automated shift the cargo toward the front of the vehicle as the seats reconfigure to the position maximizing cargo storage space. It is preferred that the seat reconfiguration also minimizes access to the stored cargo as another level of security beyond a traditional trunk enclosure. A "locked" in position of the actuator for the seats (particularly the rear seat 4) severely limits the ability to remove the container/box 20 even in the event of at least one broken window. The ability of the hinge to dynamically reconfigure the side body panel enables the movement of the side body panel to securely connect to the lower trunk while in the driving mode. It is essential during the driving mode for the side body panel to be in structural communication with the lower trunk 6 and upper trunk 5. In addition, during loading/unloading mode it is necessary in many cases (due to a wide variety of loading/unloading infrastructure restrictions) for the side panel to be dynamically reconfigured to avoid obstruction during the loading/unloading mode of boxes 20. The further ability for the side body panel 7.1 to swing inward to reduce the parking space requirement is a secondary benefit. It is an object of the invention to coordinate the inward movement of the side body panel with the concurrent interior movement of the at least one of lower courier or upper courier shelf with the boxes on the courier shelf while also concurrently the seats move into their courier drive mode further providing space not needed in the non-passenger occupied market. The hinge enables movement of the side body panel in at least two directions including from a vertical orientation swinging up, a horizontal orientation swinging inward or outward, or both vertical and horizontal orientations with all orientations relative to the rear of the vehicle.

All three positions during this mode are shown. The position of side body 7.1-A:1 is for extended mode. The position of side body 7.1-A:2 is the position when turned inwards, identical to shown in FIG. 5. The position of side body 7.1-A:3 is the position in shortened loading mode as discussed.

FIGS. 7A through 7F illustrate the process for three different trunk modes as shown in previous and subsequent figures, with emphasis on the motion of actuators 11.1 and 11.2 during movement. Upper trunk 5 is segmented into at least three sections which fold and overlap as shown in FIG. 7D (i.e., sections 5.2-5.4) and known in the art, e.g., used commonly for convertible top cars. FIGS. 7A through 7F illustrate upper trunk 5 with five sections, 5.1-5.5, three of which fold and overlap (5.2-5.4). Shortened mode as shown in FIG. 5 may have either additional or larger sections which fold and overlap to increase the total amount of trunk length removed. It is understood that the passenger driving mode is indicative of passengers occupying at least the rear seat 4 and in most scenarios the front seat 3 (even if just the "driver" position), in particular the seats 3 & 4 are utilized for non-cargo operations.

FIG. 7A illustrates car 1 in passenger, extended driving mode, identical to that shown in FIG. 1, however with segmented sections of upper trunk 5 (sections 5.1-5.5) and actuators 11.1 and 11.2 labeled. FIG. 7B illustrates car 1 in loading mode. FIG. 7C illustrates car 1 in collapsed mode, similar to that shown in FIG. 5, with the overlapping sections 5.2-5.4 identified. The trunk space 21 in collapsed mode is necessarily less (by at least 0.01 inches) than the trunk space 21 in extended mode. Therefore the space of side body 7 which remains enclosed by trunk space 21 is also necessarily less and thus maintains a secure and weather-proof exterior. The weather stripping and secure seal between the upper trunk 5 and side body 7 is maintained as known in the art, particularly with convertible vehicles.

FIG. 7D illustrates the extended mode of upper trunk 5, identical to that shown in portion 7A. Upper trunk 5.2 is joined to upper trunk 5.3 via actuator 11.1; upper trunk 5.3 is joined to upper trunk 5.4 via any hinge known in the art, with actuator 11.2 joining upper trunk 5.4 to the rest of the upper trunk (i.e., upper trunk 5.5).

Figure 7E:
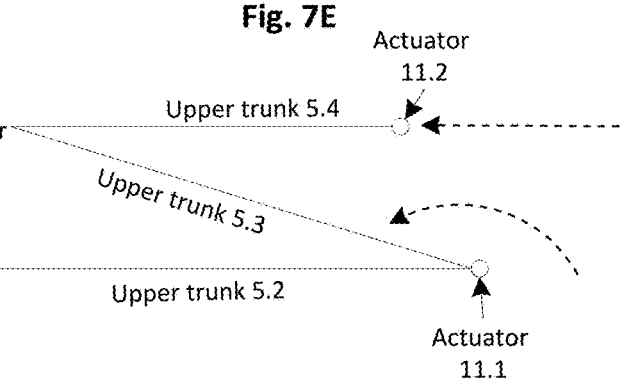
FIG. 7E is a detailed view of overlapping upper trunk sections in collapsed mode.

FIG. 7E illustrates an exaggerated view of the overlapping of sections 5.2-5.4 as shown in FIGS. 7C and 7D, particularly with regards to actuators 11.1 and 11.2 and movement illustrated with dotted arrows. Upper trunk 5.2 remains at its prior location and acts as the "first level" of the overlap. The angle of upper trunk 5.3 is exaggerated for clarity; in implementation, the total overlapping section would be nearly completely flat, as shown in previous and subsequent figures. Upper trunk 5.3 rotates preferably less 165 degrees and specifically preferred less than 180 degrees towards the front of the car 2, i.e., towards the passenger cabin 22, as shown by the dotted arrow. Upper trunk 5.4 maintains its original orientation (i.e., does not rotate), but is moved towards the front of car 1 in order to shorten the total upper trunk 5. The total length shortened is the distance of overlapping section 5.3. Upper trunk 5.5 acts as an extension of upper trunk 5.4, moving the same distance. The process is identical for the lower trunk 6. Each upper trunk section 5.1-5.5, including as shown in FIG. 7D and FIG. 7E, does not need to be the same length.

In this embodiment, actuators 11.1 and 11.2 are located as shown (between trunk sections 5.2 and 5.3, and between sections 5.4 and 5.5, respectively); however, actuator 11.2 could be located at the intersection of upper trunk 5.3 and 5.4 rather than at the end of upper trunk 5.4. However, when actuator 11.2 is located as shown in the figures, neither actuator 11 has to rotate along with one of the trunk sections—as shown, actuator 11.1 forces upper trunk 5.3 to rotate but itself stays stationary otherwise, and actuator 11.2 keeps upper trunk 5.4 in its position but moved parallel as previously identified.

In addition, the placement of the actuators 11 as shown maintains the most flexibility for manipulating the upper trunk 5 shape. Since each actuator 11 can manipulate the angle and positions of the trunk sections on either side, the locations of actuators 11 as shown manipulate upper trunk sections 5.2-5.5, while trunk hinges 17 manipulate the angle of upper trunk section 5.1.

Figure 7F:
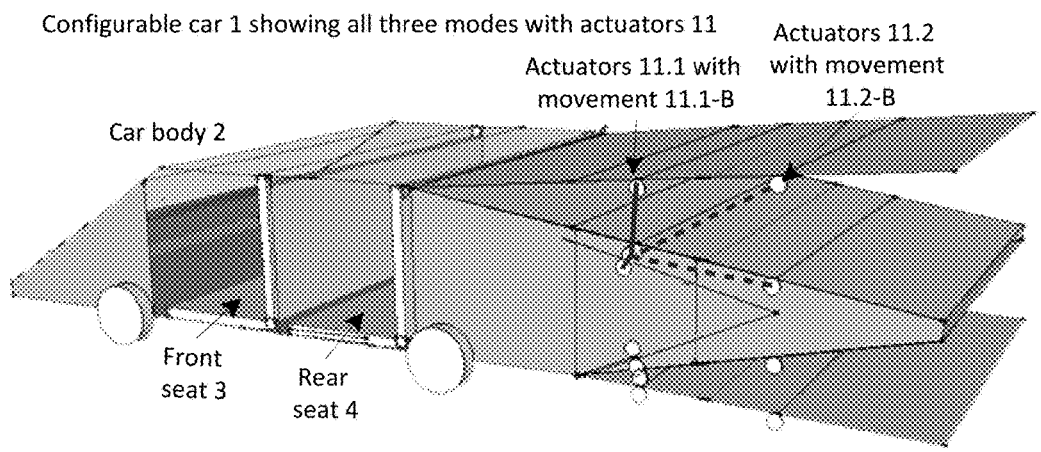
FIG. 7F is an illustration of extended, loading, and collapsed modes with actuators.

FIG. 7F illustrates the relative movement of actuators 11.1 and 11.2 throughout the three modes shown. The movement of actuator 11.1 is shown by the solid black line 11.1-B; it is relatively straight, moving almost completely vertically upwards to change from extended driving mode to loading mode, and moving almost completely vertically downwards to change from extended driving mode to shortened mode.

The movement of actuator 11.2 is shown by the dotted black line 11.2-B. The movement from driving to loading mode is similarly nearly vertical, but as shown in FIG. 7D, the movement from driving to shortened mode is in the direction parallel to the upper trunk 5. The movement and configuration is identical for lower trunk 6.

It is a fundamental objective of the invention for the vehicle (car 1) to have an at least one upper trunk 5 to be comprised of at least two dynamically reconfigurable (foldable) positions such that easy (and automated) access of container(s)/box(es) 20 enabling loading or unloading. Preferably the access to containers/boxes 20 can be dynamically configurable to have at least two access modes of top access, rear access from ground level or rear access from top level (i.e., whether the rear access begins from containers/boxes 20 that start from above the vehicle (car 1) or from below the vehicle (or ground level). The top access mode is such that the containers/boxes 20 are placed directly into the trunk (i.e., motion is predominantly in the Z plane (up/down) first and then once place onto the lower trunk 6 or upper courier shelf 9 (as depicted in FIG. 8) are moved in the X or Y planes (further into the vehicle and/or left or right towards the side of the vehicle). The rear ground access mode is such that the containers/boxes 20 are first raised from the ground level to above the lower trunk 6 level (but below the upper trunk 5 level) in the Z plane and then moved in at least the Y plane (further into the vehicle) and optionally moved left or right towards the side of the vehicle). The rear top access mode is identical to the rear ground access mode except that the containers/boxes 20 are first lowered from an already raised position to below the upper trunk 5 level (but above the lower trunk 6 level) in the Z plane prior to movement of the containers/boxes 20 in the Y plane into the vehicle cargo space.

Figure 8A:
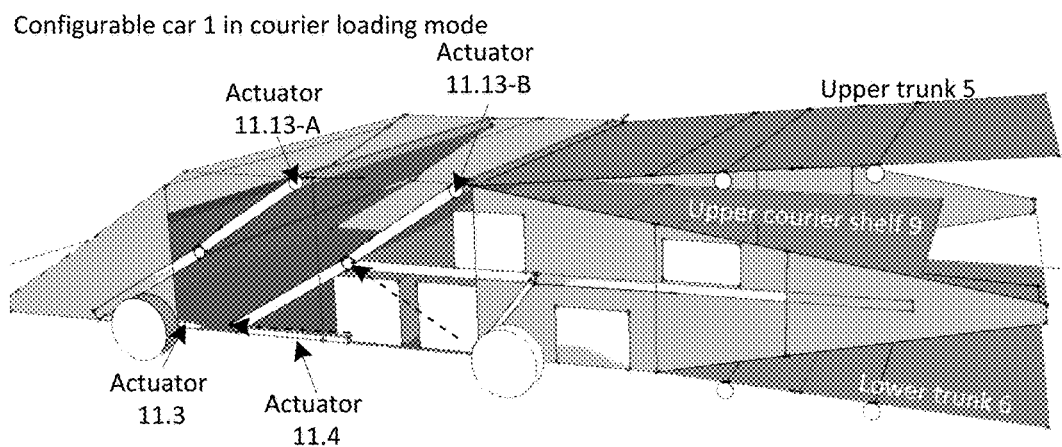
FIG. 8A is an illustration of one embodiment in courier loading mode.
Figure 8B:
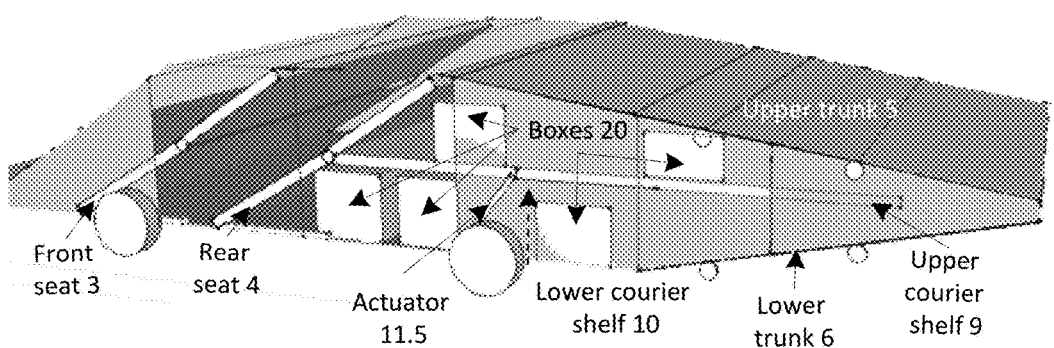
FIG. 8B is an illustration of the present embodiment in courier extended driving mode.

FIGS. 8A and 8B introduce one embodiment of the present invention in courier mode. The present embodiment must operate in autonomous mode unless it is implemented on only one side (i.e., the driver's side of the car 1 remains in passenger mode). This may require the use of physical dividers (e.g., net, fence, curtain, etc.) known in the art in order to prevent access to boxes 20 from the driver, however reconfigurable dividers that double in function as the rear seat 4 is unique to the invention. It is further unique to the invention that an optional upper courier shelf 9 is directly mechanically coupled to the rear seat 4. Another optional embodiment is such that the rear seat 4 is mechanically coupled to the upper trunk 5 such that both the rear seat 4 and the upper trunk 5 can be moved through either an automated (preferred, but can also be manual) common linkage/actuator to reconfigure into the courier mode from any of the other modes of this invention. Boxes 20 refers to the entire collection of individual packages (illustrated by cube shapes in portion 8B, preferably where the boxes are standardized to maximize compatibility across industries, globally, and vehicle types). Front seat 3 and rear seat 4 move along actuator 11.3 and 11.4, respectively, as shown. FIG. 8A illustrates the present embodiment during loading mode and FIG. 8B illustrates the present embodiment during autonomous extended driving mode. The process of raising the rear seat 4 as shown optionally raises the upper courier shelf 9, that provides an additional level for package storage (which would be in physical communication with the dual shelf loading dock 16 shown in previous figures, though it is understood that non-interlocking or individual though coordinated actuators can emulate the result achieved by physical interlocking). Optional actuator 11.5 provides additional physical support for the upper courier shelf 9 and is in physical communication between the upper courier shelf 9 and the lower courier shelf 10 or elsewhere preferably near the interior of the bottom of the car body 2. Additional actuators 11 may be required to support the upper courier shelf 9 in a similar manner as known in the art, which is collapsed/nonvisible when in passenger mode and extended for structural support when in the courier mode. The lower trunk 6 acts in an identical manner as shown in prior figures—it may lower to less than, equal to, or more than a horizontal position relative to its position while in the driving mode and is in physical communication with the lower level of the loading dock 16. It is an object of the invention for the courier mode to concurrently maximize cargo space, minimize passenger space through the movement frontward of the rear seat 4 (and optionally for the front seat 3 to enable even further movement of the rear seat 4 as no passenger space, particularly leg room is required). It is a further object of the invention such that boxes/containers 20 are removed from the lower trunk 6 level first and that the upper courier shelf 9 is lowered to be directly on top of the lower trunk 6 level such that the automated loading/unloading equipment all occurs at virtually identical height (Z plane) for both the lower trunk 6 level and the upper courier shelf 9 level. Likewise, loading takes place first on the upper courier shelf 9 (while directly on top of lower trunk 6) and then the upper courier shelf 9 is raised such that direct access is enabled to the lower trunk 6 level.

Figure 10A:
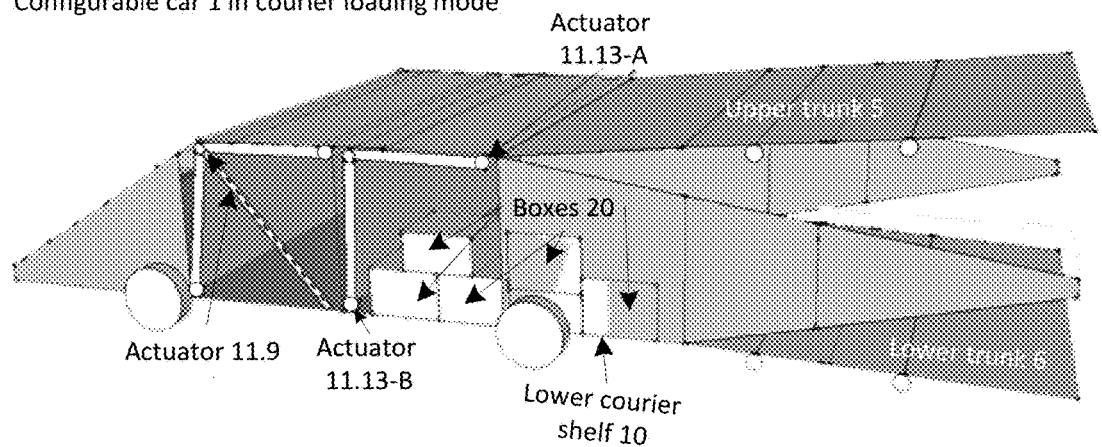
FIG. 10A is an illustration of one embodiment in courier loading mode.
Figure 10B:
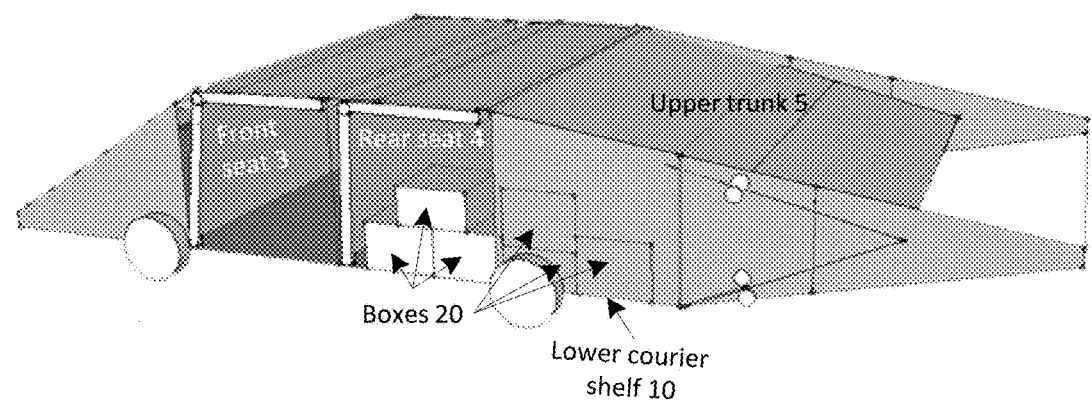
FIG. 10B is an illustration of the present embodiment in courier collapsed driving mode.
Figure 10C:
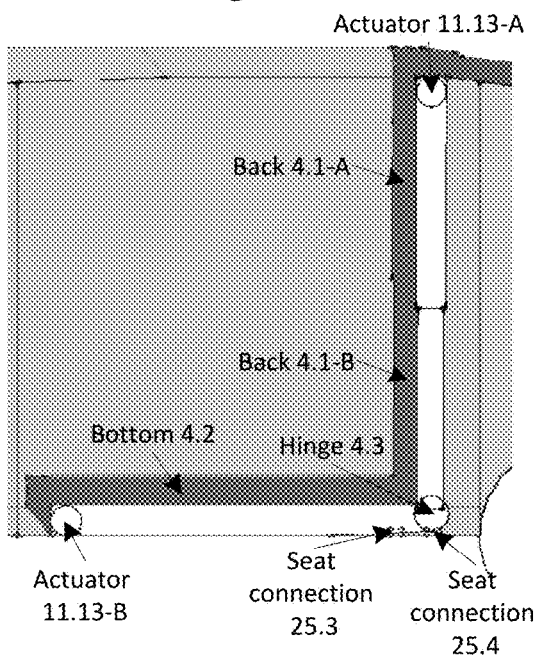
FIG. 10C is a detailed view of one embodiment of the rear seat.
Figure 10D:
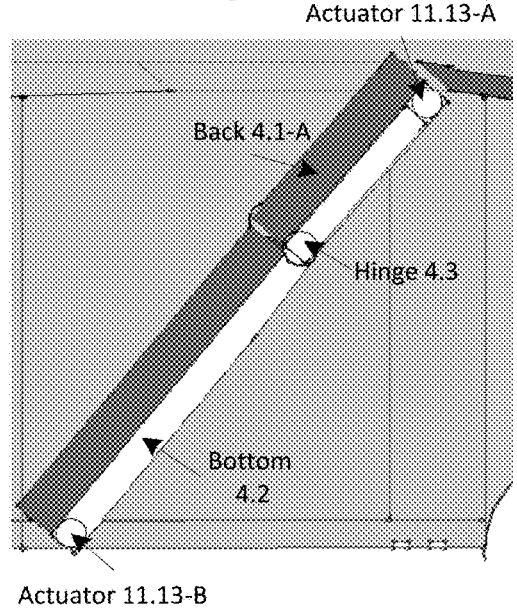
FIG. 10D is an illustration of one embodiment of the process of the rear seat changing from passenger mode to courier mode.
Figure 10E:
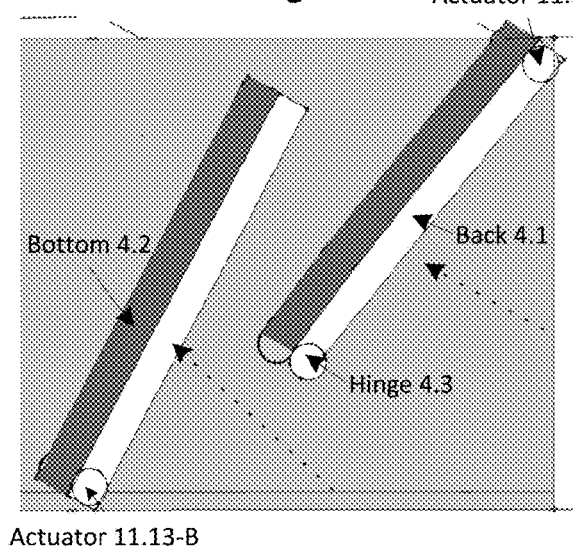
FIG. 10E is an illustration of another embodiment of the process of the rear seat changing from passenger mode to courier mode.

In addition, the embodiment of the front seat 3 as shown in portion 8A, particularly its movement and physical communication with actuator 11.3 is also illustrative of a possible transition mode position between passenger mode and courier mode and is an alternative embodiment to the transition modes shown in FIGS. 10C and 10E.

FIG. 8B is identical to portion 8A except the present embodiment is shown in autonomous extended driving mode. Package sizes and loading order must be such that the upper 5 and lower 6 trunks can completely close to switch between loading to driving mode, i.e., the total height of each box 20 in its final courier driving position must be less (by at least 0.01 inches) than the distance from the top resting surface of upper courier shelf 9 to upper trunk 5 or from lower trunk 6 or lower courier shelf 10 to the bottom resting surface of upper courier shelf 9. In all embodiments shown in subsequent and previous figures, the total height of each box 20 is strongly preferred to be less (by at least 0.01 inches) than the distance from upper trunk 5 to lower trunk 6 or the height of passenger cabin 22 when in driving mode.

If the height of a box 20 is greater than that distance (by at least 0.01 inches), then the car 1 will remain in loading mode. (I.e., the upper trunk 5 or lower trunk 6 will not close fully and thus will not be secure or weather proof) even while driving. If not being secure or weather proof is acceptable to the user, then loading mode can remain while driving thus is not always mutually exclusive to driving mode. (This is an embodiment known in the art and analogous to drivers who "drive with the trunk open", which may or may not be additionally secured via temporary accessories to a position less than full loading mode to prevent boxes 20 from being accidentally discharged from the trunk space 21.

It is understood that any reference to the term "greater than" is by at least 0.01 inches greater than the referenced position. And any reference to the term "lower than" is by at least 0.01 inches lower than the referenced position. It is further understood that in virtually all scenarios the distance can be even smaller down to the order of 1 micron but the standard is such that at least an adequate clearance, as known in the art, is provided for all vehicle parts as they are reconfigured from one operating mode to another.

In FIGS. 8A and 8B embodiment, the rear seat 4 creates and maintains a physical barrier between the passenger cabin and the trunk area. Restricting the ability for passengers to access the trunk area increases the security of the courier packages 20. In this embodiment, the front seat 3 moves in order to clear room for the rear seat 4 and importantly to minimize wasted space between the front seat 3 and the rear seat 4. It is understood that this configuration can also be suitable for driving mode when the vehicle is autonomous, or when the front seat 3 is split (left and right, such that front seat is positioned in a driver position when a driver is required or when the front seat (either left and/or right) are occupied by passengers.

Figure 9A:
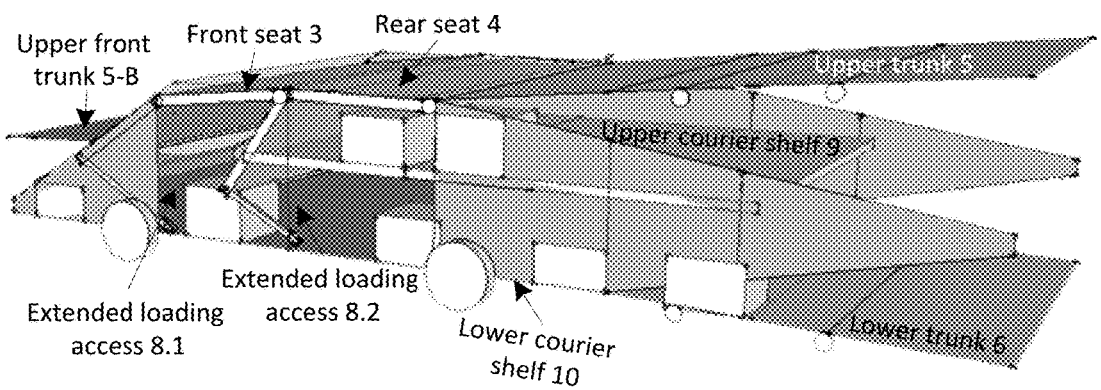
FIG. 9A is an illustration of one embodiment in courier loading mode.
Figure 9B:
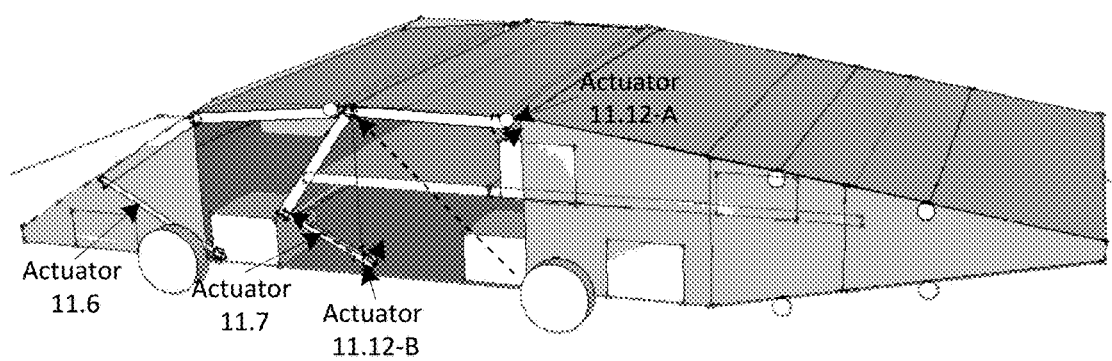
FIG. 9B is an illustration of the present embodiment in courier extended driving mode.
Figure 9C:
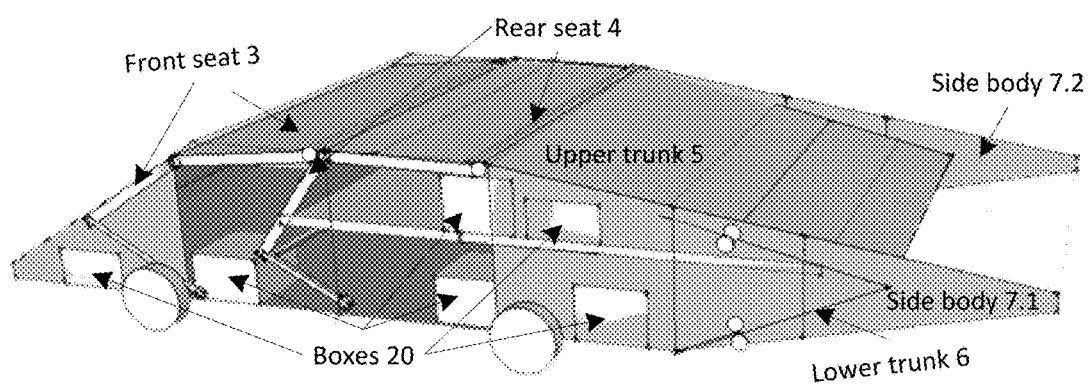
FIG. 9C is an illustration of the present embodiment in courier, collapsed driving mode.

FIGS. 9A, 9B, and 9C illustrate yet another embodiment of the present invention in the extended driving mode creating an extended loading access 8 to maximize the courier space into the otherwise passenger cabin 22; though access to packages 20 by any passenger is now possible. The present embodiment must operate in the autonomous mode unless it is implemented on only one side (i.e., the driver's side of the car 1 remains in passenger mode). The front seat 3 could remain in non-autonomous driving mode, but the rear seat 4 could not extend as far along actuator 11.7 (or actuator 11.7 is shorter). This could maintain a security barrier between the driver location and package storage if the extended loading access 8 extends behind only the driver location.

FIG. 9A illustrates the present embodiment in the loading mode. Extended loading access 8 enables total access such that the upper front trunk 5-B allows dual loading mode, i.e., package loading into car 1 through both the front and rear of the car 1. FIG. 9B illustrates the present embodiment as an autonomous courier, extended beyond the driving mode when an actual driver is required thus occupying the front seat 3 (though not depicted in this figure). FIG. 9 portion 9B is identical to portion 9A except trunks 5 and 6 are now completely closed. Portion 9C illustrates the present embodiment in the vehicle shortened mode as shown in FIG. 7 portions 7C and 7D.

FIGS. 10A-10F show another embodiment of the present invention. The movement of rear seat 4 provides additional package space in the lower courier shelf 10. The movement of front seat 3 also provides additional space which is not accessible through the rear of the car (i.e., trunk 21). When the space is to be utilized, packages must be loaded through the sides (i.e., the doors 14) or through the rear. This embodiment has the benefit of maintaining a physical barrier between the passenger cabin and the packages for security purposes. It is a fundamental aspect of this embodiment that at least one of the front seat 3 and rear seat 4 are reconfigured in a collapsed position such that the collapsed position is upwards towards the upper trunk 5 (i.e., the top of vehicle interior) thus maximizing package space in the lower interior region of the vehicle. It is understood, and as known in the art, that a rear-facing camera (not shown) can provide visibility to the driver via a user-interface screen/display (not shown) that is otherwise obstructed by at least one of the front seat 3 or rear seat 4. Placement of the camera is drawn upon the prior art including 360 view as known in the art.

Actuator 11.9 as shown is connected to the front seat 3 that can also be similarly applied respectively to the rear seat 4, or though not shown where the front seat 3 actuator is physically coupled/interlocked to the rear seat 4 actuator. The courier position of rear seat 4 does not necessarily require movement of the front seat 3. This is one embodiment that allows for non-autonomous mode without any modification to the courier system, or in the instance in which the additional package space otherwise made available by displacement of front seat 3 is not required (i.e., lower than 100% package/container utilization factor). The position of front seat 3 is another embodiment of the possible front seat 3 positions which may be applicable to the embodiments of the rear seat.

FIG. 10A illustrates the present embodiment in the extended loading mode and FIG. 10B illustrates it in the collapsed driving mode. In this embodiment, there is no upper courier shelf 9 depicted.

FIG. 10C illustrates a detailed view of one embodiment of the rear seat 4 to change to the position shown in portion 10A (the analogous when respectively applied to the front seat 3). In this embodiment, the back of the seat is made of an upper section, back 4.1-A, and a lower section, back 4.1-B which nests inside back 4.1-A when it is collapsed.

Back 4.1-B is thinner than back 4.1-A so that it can telescope inward to collapse the entire back 4.1 so that rear seat 4 can pass into the position shown in portion 10A while remaining connected to the hinge 4.3 and bottom 4.2. Back 4.1-B nests inside back 4.1-A regardless of embodiment, for example with seating suspension 24 as shown in subsequent figures or cushions known in the art, provided they are divided into at least two sections whereby they nest or telescope inside each other to collapse for transition as shown in portion 10D.

FIG. 10C illustrates the rear seat 4 in the passenger mode. An optional seat connection 25.3 and seat connection 25.4 secure the bottom 4.2 and back 4.1 to the car body 2, respectively. Portion 10D illustrates the rear seat 4 in transition mode between the passenger mode as shown in portion 10C and the courier mode as shown in portion 10A. Alternatively, another embodiment of transition mode is shown in the front seat 3 in FIG. 8 portion 8A, with the movement along actuator 11.3.

FIG. 10E illustrates another embodiment for the rear seat 4. Rather than maintain the complete connection between bottom 4.2 and back 4.1 during the transition mode, each section moves separately into the courier mode in the directions shown by the dotted arrows before reconnecting again in the courier mode.

Figure 11A:
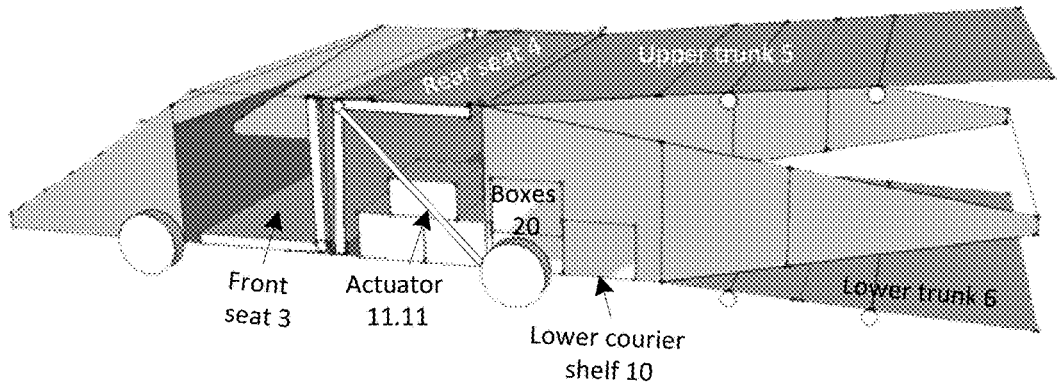
FIG. 11A is an illustration of one embodiment in courier loading mode.
Figure 11B:
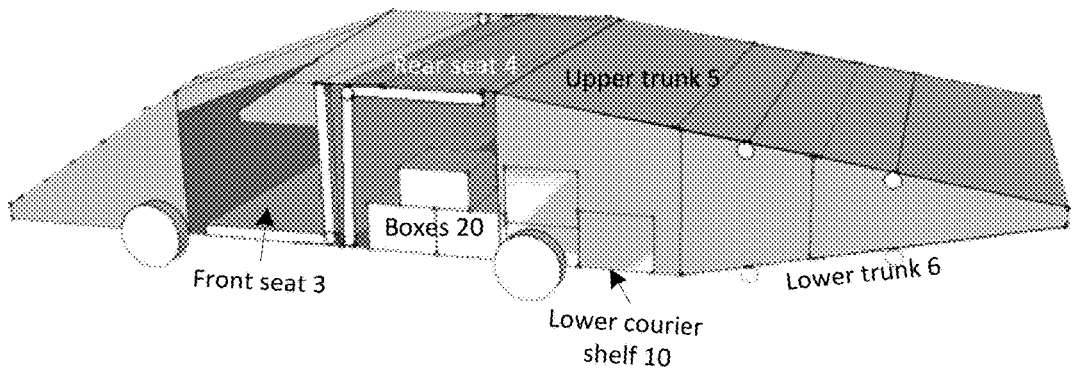
FIG. 11B is an illustration of the present embodiment in courier driving mode.

FIGS. 11A and 11B are identical to FIGS. 10A and 10B except FIGS. 11A and 11B depict the front seat 3 in the passenger driving mode.

Figure 12A:
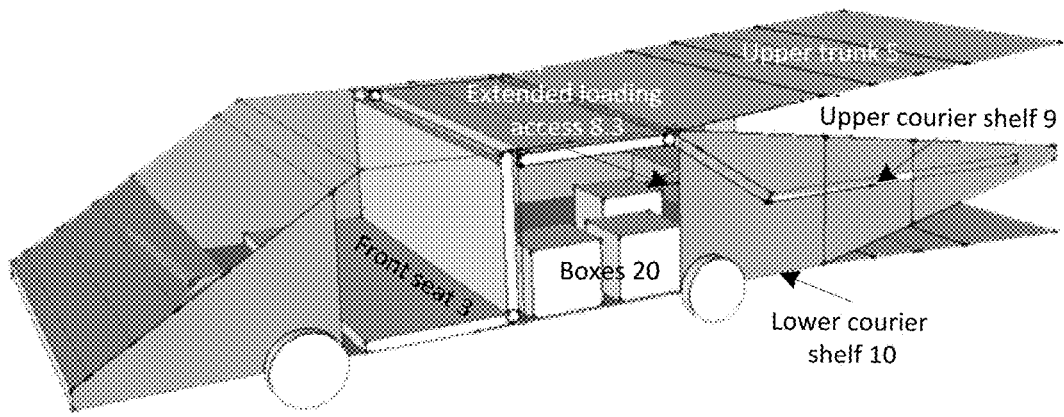
FIG. 12A is an illustration of one embodiment in courier loading mode.

FIG. 12A illustrates another embodiment of the present invention. It illustrates another embodiment which allows for extended loading access 8 while still allowing for non-autonomous driving. FIG. 12A illustrates the present embodiment in the courier loading mode and portion 12B illustrates it in the non-autonomous extended driving mode. The rear seat 4 extends into its loading position via the actuator 11.10. The present embodiment depicts both a lower courier shelf 10 and upper courier shelf 9.

Figure 12B:
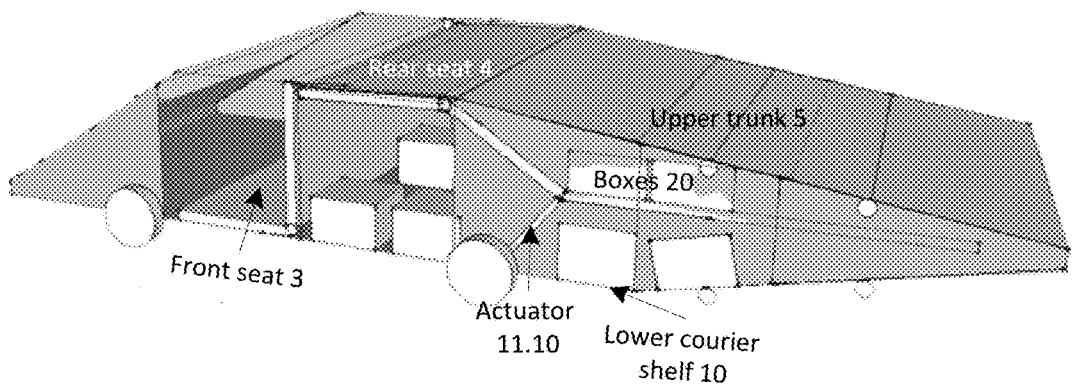
FIG. 12B is an illustration of the present embodiment in courier driving mode.

FIG. 12B also illustrates boxes 20 located along the entire length of the lower courier shelf 10, including the tapered section of lower trunk 6. Locating boxes 20 along the entire length of lower courier shelf 10 and lower trunk 6 is possible with all previous embodiments. It is a fundamental object of the invention such that boxes/packages 20 can be loaded into the vehicle from a "shuttle" (not shown) moving on the ground level and/or moving from above the vehicle (not shown, such as from a supported conveyor or shuttle track from a physical building structure). It is recognized that the vehicle needs to be operational in a wide range of physical settings in which a further range of parameters including physical space constraints, utilization factors for shuttle equipment within its host building, and people interaction within the confines of where the boxes 20 are loaded/unloaded for safety concerns etc.

Figure 13A:
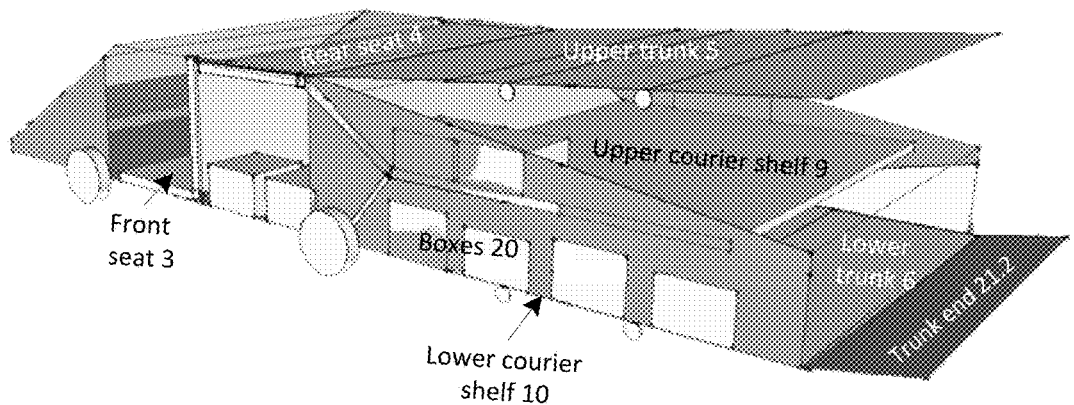
FIG. 13A is an illustration of one embodiment in courier loading mode.
Figure 13B:
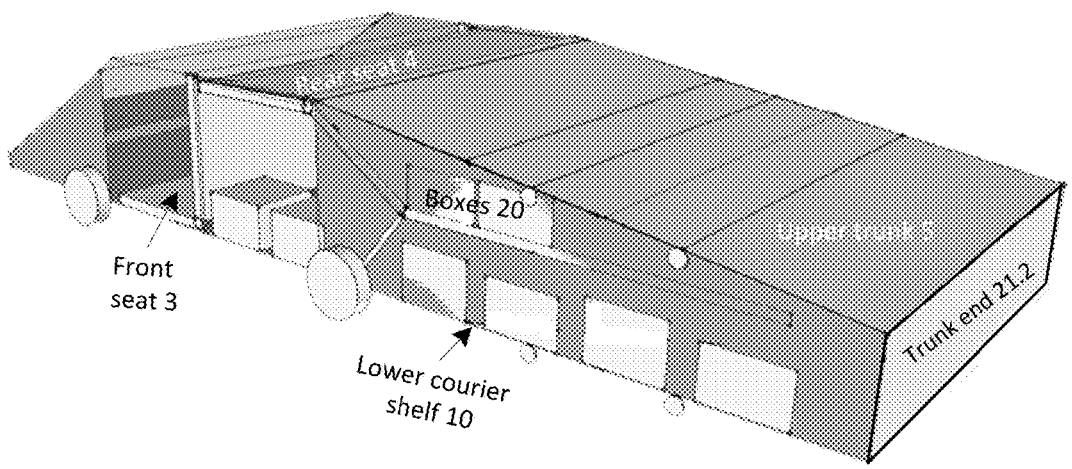
FIG. 13B is an illustration of the present embodiment in courier extended driving mode.

FIGS. 13A and 13B illustrate another embodiment whose priority is increasing the trunk area 21 rather than aerodynamics. Compared to previous figures, the lower trunk 6 is approximately close to horizontal. This increases the space within the trunk end 21.2. FIG. 13A illustrates the present embodiment in the courier loading mode. The process is identical to that shown in previous figures, except the trunk end 21.2 must fold down (or optionally upwards to allow access to the trunk area 21 from a logistics device (not shown) that is structurally in communication with the logistics device host building infrastructure. The trunk end 21.2 does not generally exist in the other embodiments depicted since the trunk completely tapers. In any embodiment where it does exist, it must fold up or preferably also have fold down to allow for loading/unloading from either the ground level or from the top. Though not depicted as being in structural communication with upper trunk 5, it is understood that the trunk end 21.2 can be in structural communication with the upper trunk 5, analogous to what is depicted where the trunk end 21.2 is in structural communication with the lower trunk 6. The preferred embodiment is such that the trunk end 21.2 is in a releasable structural communication with both the upper trunk 5 and the lower trunk 6 such that the trunk end 21.2 can fold onto either the upper trunk 5 or the lower trunk 6 or such that the trunk end 21.2 is released from the lower trunk 6 and remains in structural communication with the upper trunk 5 when the additional length of the trunk end 21.2 is not required for loading/unloading. The trunk end 21.2 can optionally fold down (and essentially hang) from the lower trunk 6 also when the additional length is not required for loading/unloading.

FIG. 13B is identical to portion 13A but illustrates the present embodiment in the courier extended driving mode where the trunk end 21.2 is in structural communication with at least one (and preferably both) the upper trunk 5 and the lower trunk 6.

Figures 14A, 14B:
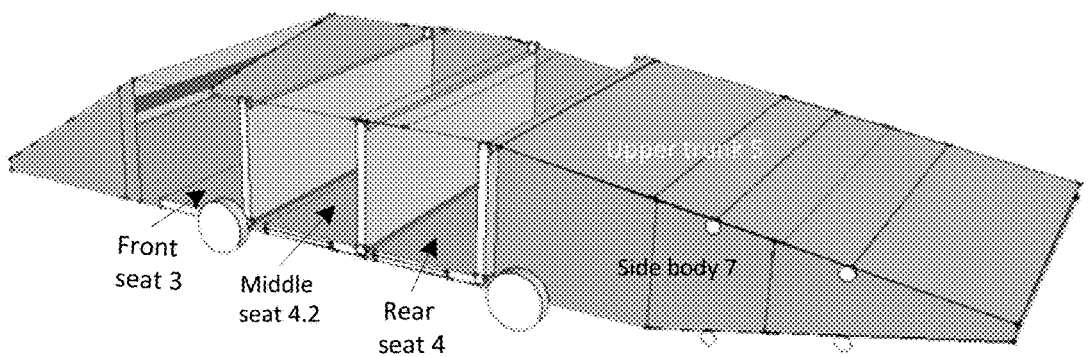
FIG. 14A is an illustration of one embodiment with three rows of seats in extended driving mode.
FIG. 14B is an illustration of the present embodiment in courier extended driving mode.

FIGS. 14A and 14B illustrate another embodiment of the present invention with the option of three rows of seats rather than two—front seat 3, middle seat 4.2, and rear seat 4. All seats act the same as shown in previous figures, but have increased possibilities for courier mode, primarily that both rear seat 4 and middle seat 4.2 can change to different embodiments of courier mode, while the front seat 3 remains in passenger mode or also changes to another embodiment of courier mode. FIG. 14A shows all three seats in passenger mode. FIG. 14B illustrates front seat 3 in passenger mode with middle seat 4.2 and rear seat 4 in different embodiments of courier mode. Middle seat 4.2 shows the embodiment from FIGS. 11A and 11B and rear seat 4 shows the embodiment from FIGS. 12A and 12B.

Figure 15A:
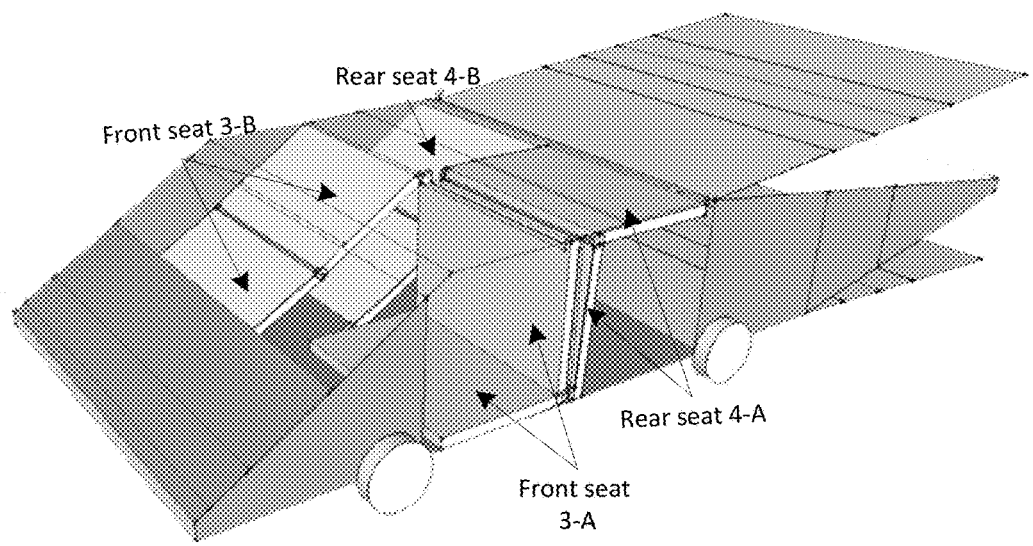
FIG. 15A is an illustration of one embodiment in courier loading mode.
Figure 15B:
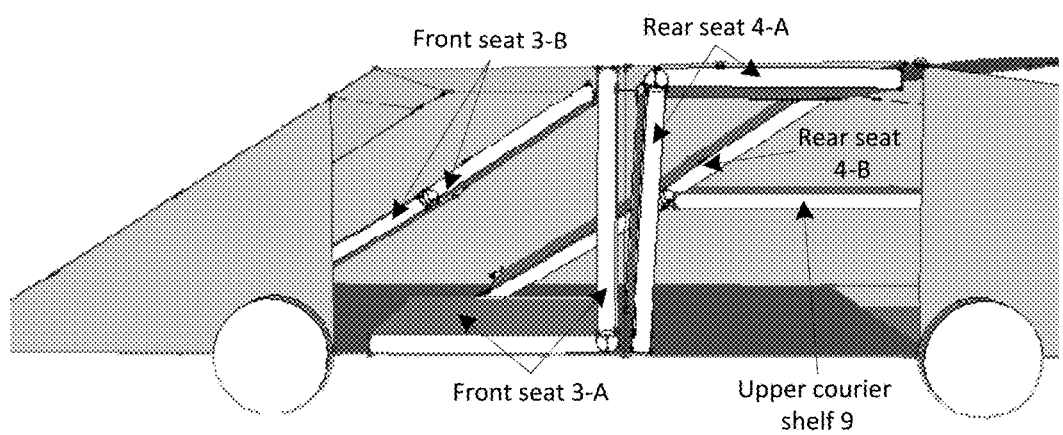
FIG. 15B is another view of the present embodiment.

Although the embodiments shown in the figures illustrate the present invention implemented along the entire vehicle, it may be implemented only on one side of the vehicle as shown in FIGS. 15A and 15B in order to allow any passenger (if remaining autonomous) or driver (if non-autonomous), or any combination of the embodiments shown—e.g., the driver's side may have an embodiment which allows extra trunk space, such as in FIGS. 11A and 11B, while the non-driver side may have an embodiment which utilizes the entire space, such as shown in FIGS. 8A and 8B. If the car has greater than two rows of seating, multiple embodiments can be combined, for example, such as a front seat 3 in passenger mode, a middle row in the courier mode embodiment in FIG. 11, and the rear seat 4 in courier mode in the embodiment of FIGS. 8A and 8B. FIGS. 15A and 15B illustrates the present embodiment where the driver's side illustrates the embodiment shown in FIGS. 11A and 11B and where the passenger's side illustrates the embodiment shown in FIGS. 8A and 8B. FIGS. 15A and 15B are identical but from two different viewpoints. It is clearly recognized that the embodied dual seat mode maintains a fundamental object of the invention of limiting access to boxes 20 (though not shown in this figure) such that the boxes 20 are secure and not accessible to passengers or drivers as the dual seat mode limits the "reach window" size. One exemplary of the dual seat mode is a first seat that is a driver seat in a seat use position (i.e., the proper seat position for safe driving operations by the driver) and a second seat that is a passenger seat (the passenger seat is parallel with the driver seat such as traditional front seats) and the passenger seat is in the upward stowable position for the courier mode (to decrease no unused passenger occupancy space, and to increase the available cargo occupancy space). The relative positions of the driver seat to the front passenger seat limits access to the now created cargo occupancy space that is behind the front passenger seat. The relative positions of the respective seats yet has an access window (though severely limited relative to an otherwise non-stowed position such that any boxes within the cargo occupancy space can't be removed from a frontal access position (i.e., where the driver is). The preferred embodiment has the driver seat position in respect to the front passenger seat creating a limited access window that is less than at least 80% of the box smallest side area (which is the smallest area, width×height, of the six sides of a traditional box).

Figure 16A:
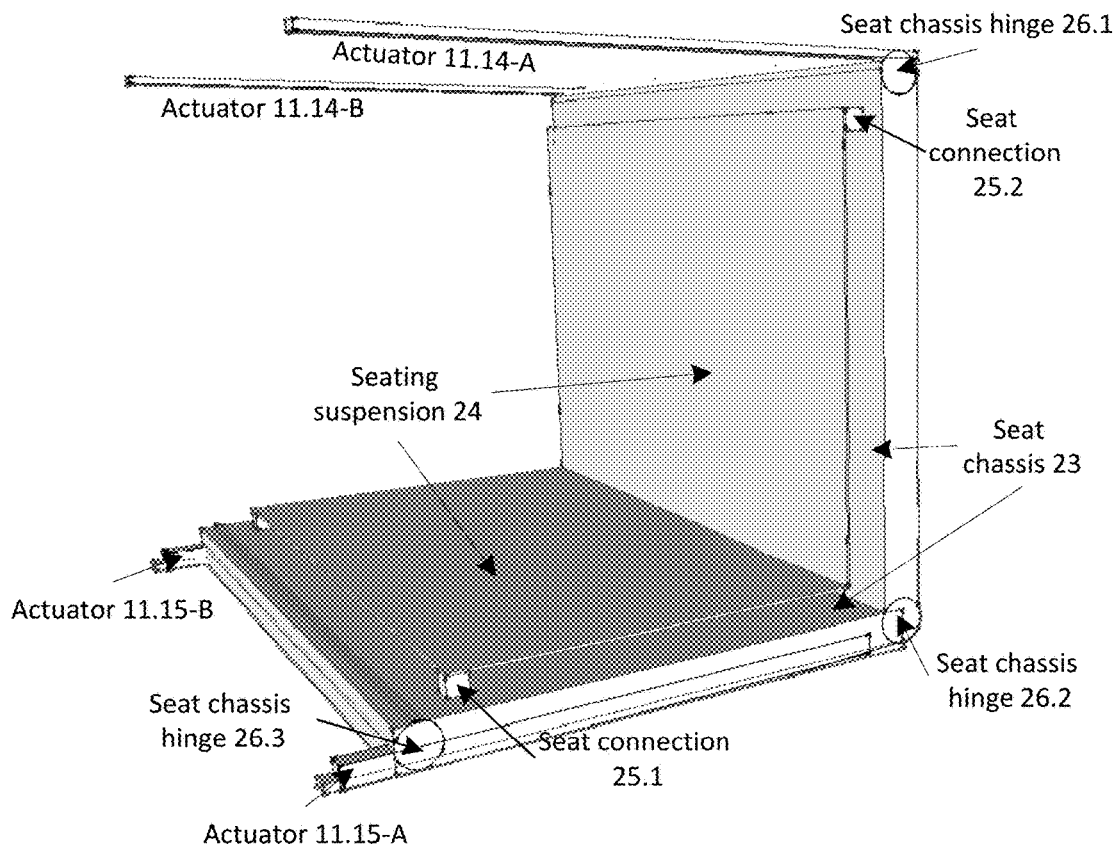
FIG. 16A is an illustration of a seat chassis with seat suspension in passenger mode.
Figure 16B:
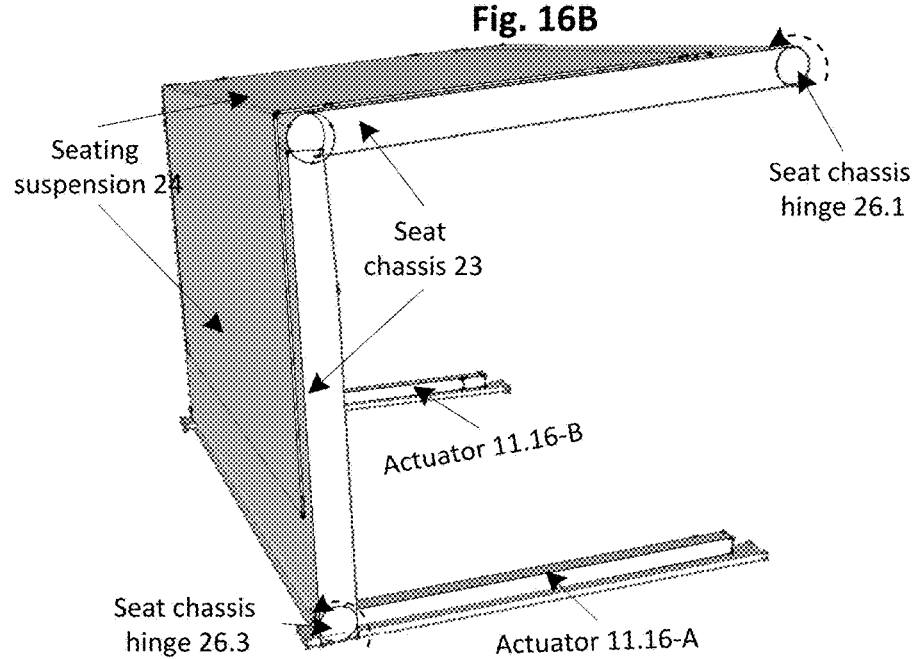
FIG. 16B is an illustration of the present embodiment in courier mode.

FIGS. 16A and 16B illustrate a detailed view of the seats 3 or 4 as shown in previous embodiments. The seat chassis 23 is structurally (used interchangeably with the term "in communication" with) attached directly to the car body 2, i.e., providing structural support, in at least two locations. FIGS. 16A and 16B demonstrate those structural support points at the seat chassis hinges 26.1 and 26.3, which in the present embodiment also provide rotational ability (i.e., the ability to rotate orientation of the structural support point) in order to change from passenger to courier mode and attach to tracks/actuators 11 for additional movement. In another embodiment where the seat 3 or 4 is designed to remain always in passenger mode, each hinge 26.1 and 26.3 can be immobilized thus providing structural support only. The seat chassis hinge 26.2 has rotational ability to move to courier mode, as shown in portion 16B, but can provide a third location for structural support when no courier mode is anticipated/expected.

Figure 19A:
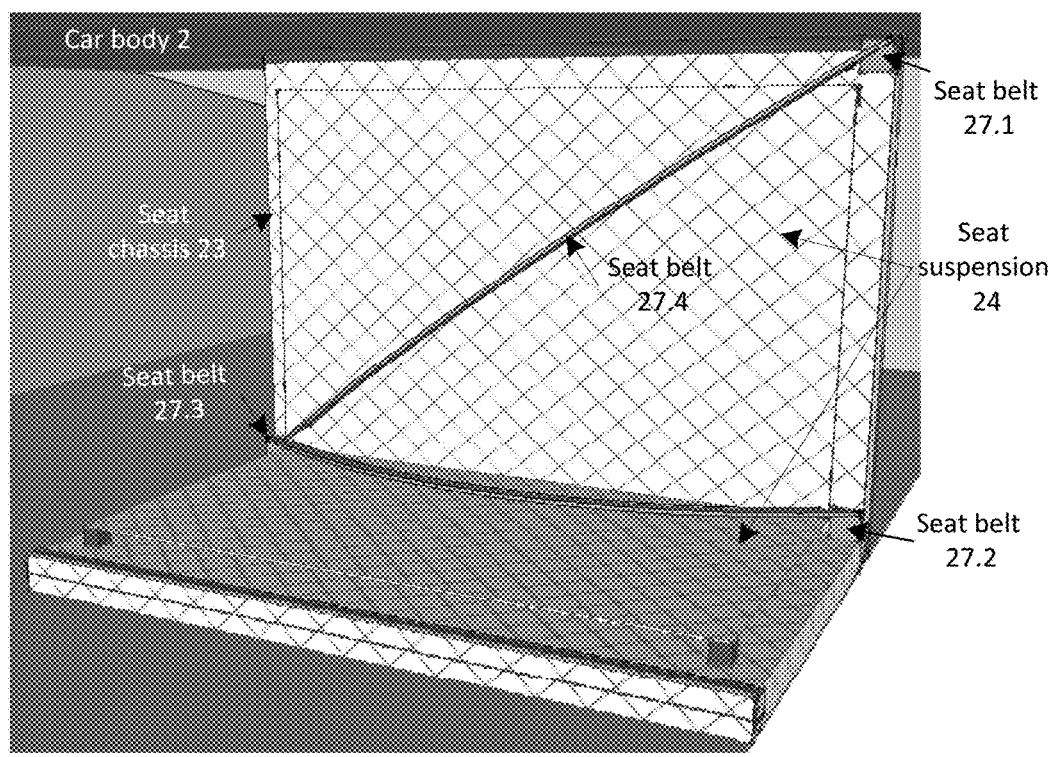
FIG. 19A is an illustration of a seat and seat belt in one embodiment of the present invention.
Figure 19B:
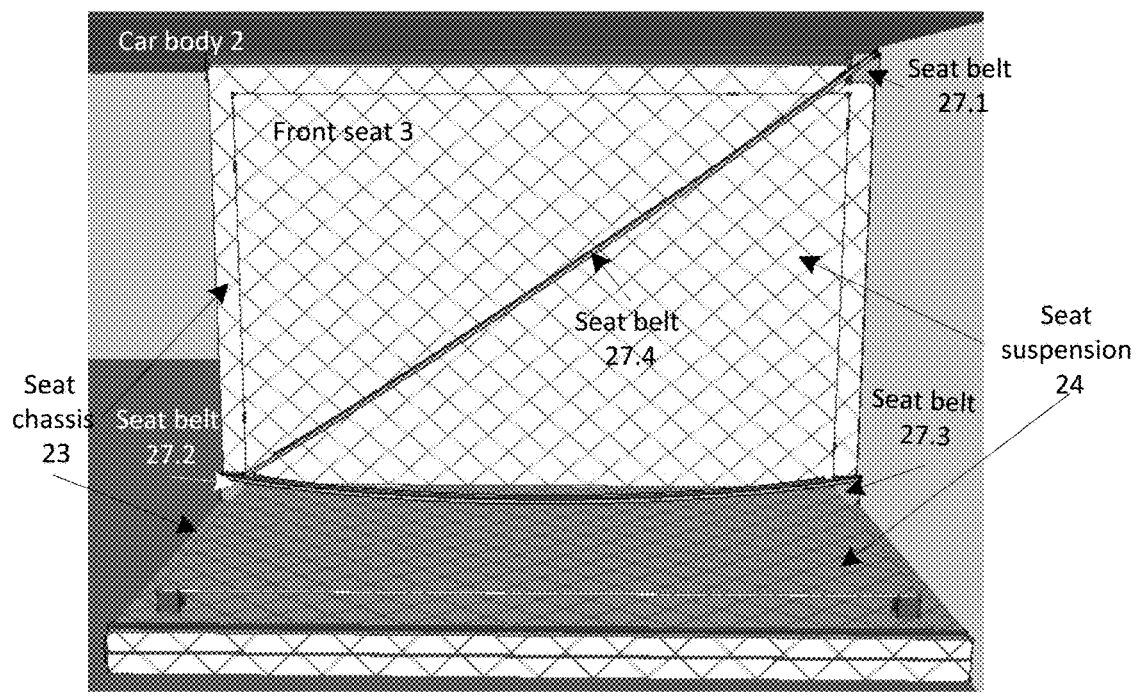
FIG. 19B is another view of the present embodiment.
Figure 20:
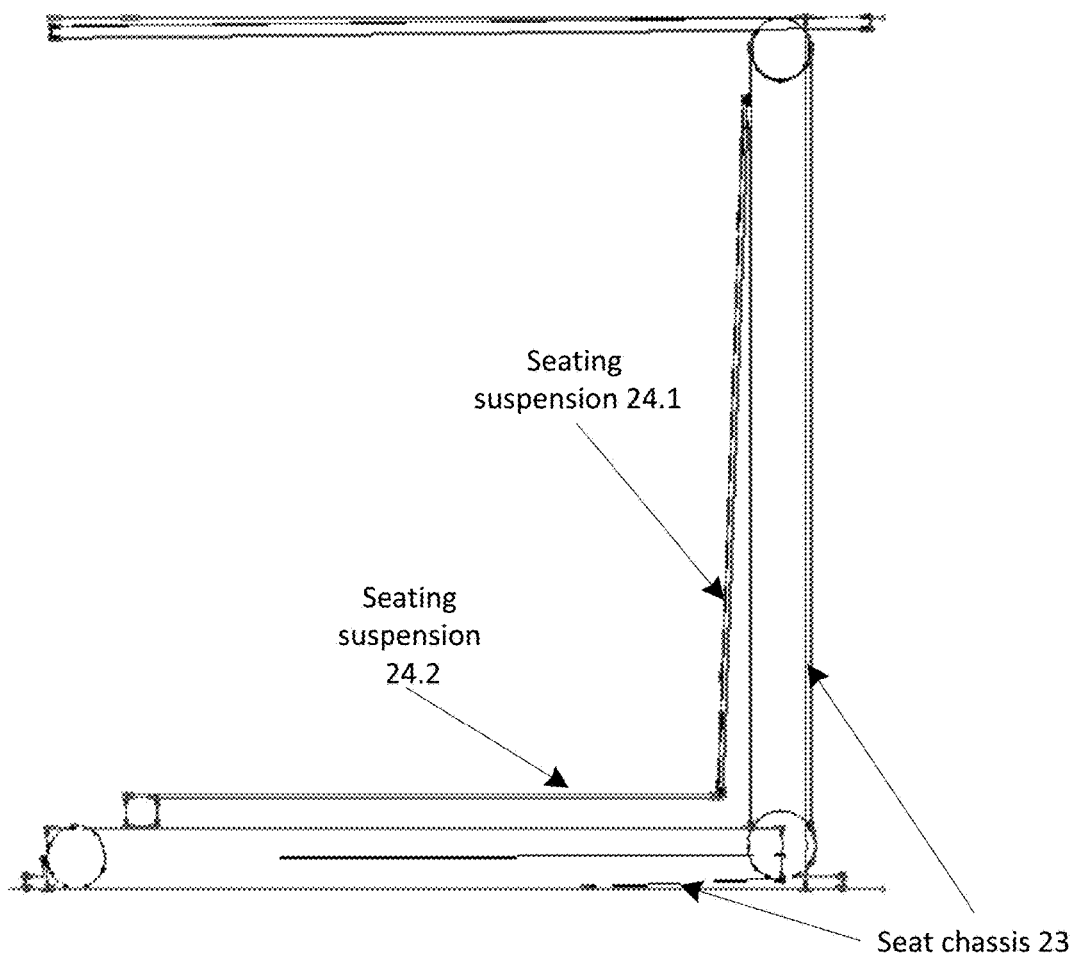
FIG. 20 is an illustration of another embodiment of the seat in the present invention.

While the seat chassis 23 provides integral structural support for both the physical act of sitting and crash safety by having structural communication with the vehicle body/chassis, the seating suspension 24 provides the specific "sitting" area for the passenger to interact with or be in physical communication with (i.e., sit in). The seating suspension 24 is preferably a flexible suspension laminate known in the art that may include an interwoven base of polyester filaments. Its thickness is greater than or equal to 0.7 mm or preferably less than 0.7 mm as known in the art and can sufficiently support the expected weight and dimensions of passengers or as required by vehicle regulations. It is an object of the invention for the seating suspension 24 to be translucent or transparent as shown in FIGS. 19A and 19B. The seating suspension 24 is connected to the seat chassis 23 via at least one seat connection(s) 25, which are located with at least one connection point per side (i.e., per back 24.1 and bottom 24.2), preferably at least two connection points per side, and specifically preferred at least four connection points per side. The embodiment of two connection points per side is shown in FIG. 16. The distance and angle between seat chassis 23 and seating 24 is variable as shown in FIG. 20. FIG. 16A shows a significant amount of available cargo (i.e., boxes 20, though not shown) as compared to FIG. 16B where there is almost no available cargo space provided for (beyond the traditional). In this embodiment, the distance and angles are changed via each seat connection 25 in methods known in the art (preferably automated such as attached electronic controls, though manual methods are also anticipated).

FIG. 16A illustrates the details of seat 3 or 4, including the actuators 11 used in different embodiments. FIG. 16B illustrates the embodiment shown in FIGS. 11A and 11B. The dotted arrow illustrates the movement of front seat 3 for transition into the courier mode. The front seat 3 can transition from the passenger mode (portion 16A) to courier mode (portion 16B) via any embodiment shown in previous and subsequent figures, particularly the embodiments shown in FIGS. 8A and 8B, and FIGS. 10C and 10D, or 10E.

The seat hinge 26.2 rotates to the opposite corner as shown, while concurrently hinges 26.1 and 26.3 rotate. In addition, movement of seat 3 or 4 along actuator 11.14 and/or 11.15 creates the flexibility of location of the seat 3 preference, particularly for a non-autonomous driver. The movement also allows for the additional space needed for transitioning from passenger mode shown in FIG. 16A to the packages mode shown in FIG. 16B. That is, the intermediary step looks like front seat 3 in FIGS. 8A and 8B.

For the driving modes, the location and position are determined both by the position of the seat chassis 23 relative to the car body 2 (such as 2' from the dashboard 12) and the position of the seat suspension 24 as shown in FIG. 20.

Figure 17A:
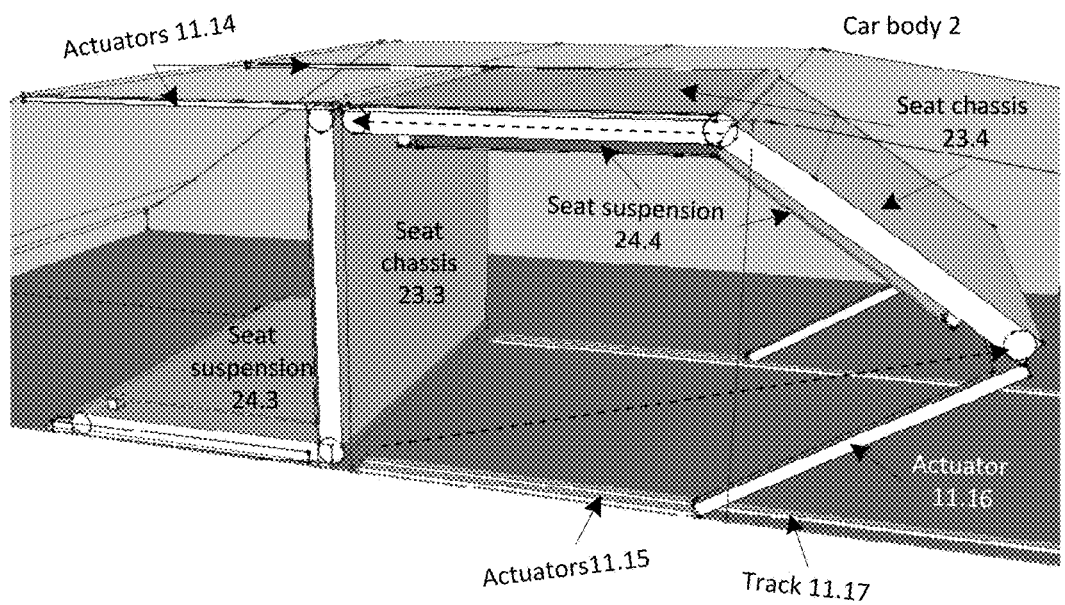
FIG. 17A is an illustration of one embodiment in courier mode.
Figure 17B:
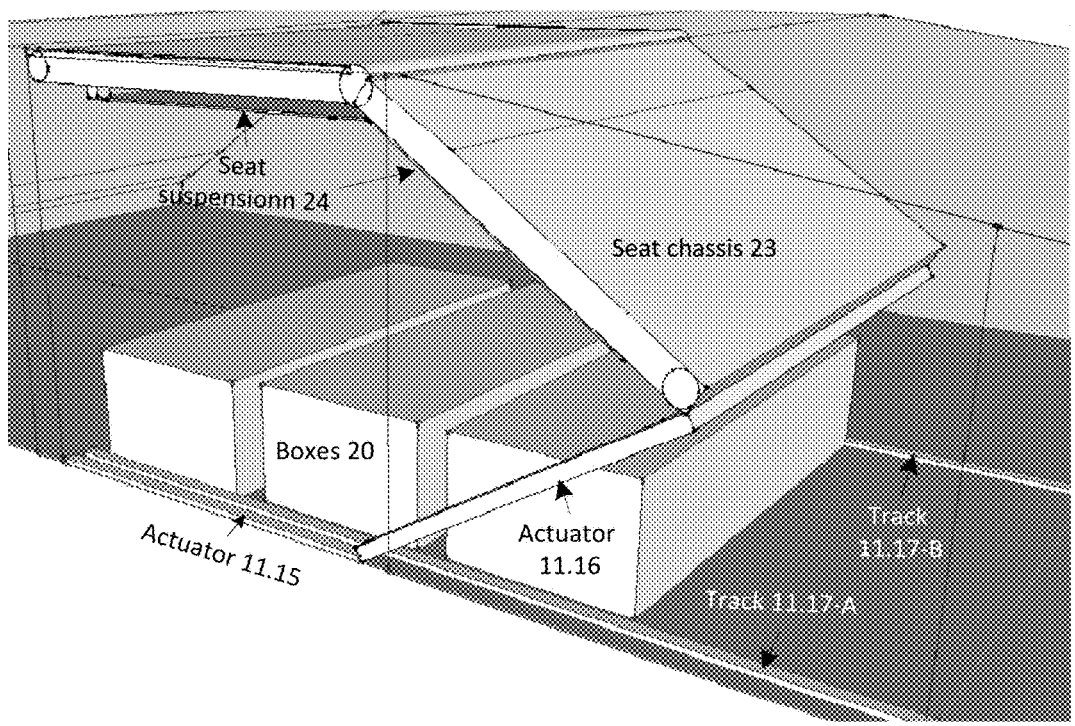
FIG. 17B is an illustration of the present embodiment including boxes.

FIGS. 17A and 17B illustrate further details of the embodiment shown in FIGS. 12A and 12B. The seats 3 and 4 include the embodiment shown in FIGS. 16A and 16B, wherein seat chassis 23.3 provides structural support. FIG. 17 portion 17A illustrates seat 3 in passenger mode and seat 4 in courier mode. All actuators are the same as shown in detail in FIGS. 16A and 16B. In the present embodiment, the seat hinge 26.3 and actuator 11.16 slide along the actuator/track 11.15 until it reaches the end, where the actuator 11.16 extends to create an extended access 8.3. The seat 4 in the extended mode shown is not mutually exclusive to traveling the entire length of actuator 11.15. While in the passenger mode, actuators 11.15 and 11.16 lie next to or on top of each other. At the same time, seat hinge 26.1 moves from its original position to the end of actuator 11.14.

Track 11.17 provides a mechanism for loading/unloading boxes 20 via any technology which requires or is enhanced by a track which preferably guides and/or locks boxes 20 in place, as known in the art. FIG. 17B illustrates the interaction between boxes 20 and track 11.17 while in courier mode. It is an object of the invention such that the track is both a structural element between the seat and the vehicle chassis AND is at least one of a guide or structural lock for the cargo/boxes 20. The preferred embodiment has the track in structural communication directly with the bottom car body 2.2 FIGS. 24A and 24B (which can also double as the lower courier shelf 10 (FIG. 8B) or the lower trunk 6 (FIG. 3A), and with the seat actuator 11.12-B (FIG. 9B) and also with the cargo/boxes 20 (FIG. 17B, operable to lock in place preferably during driving mode). The track guide 11.17 for the package (i.e., box 20) is preferably in structural communication with the at least one courier shelf such that the track guide is additionally a structural element providing further structural integrity (without unnecessarily increasing the vehicle weight) for one courier shelf (either or both the lower 10 or upper courier shelf 9), and also provides a guide for the loading or unloading of the box 20, and optionally a locking mechanism to secure the at least one package when the vehicle is in driving mode.

Figure 18A:
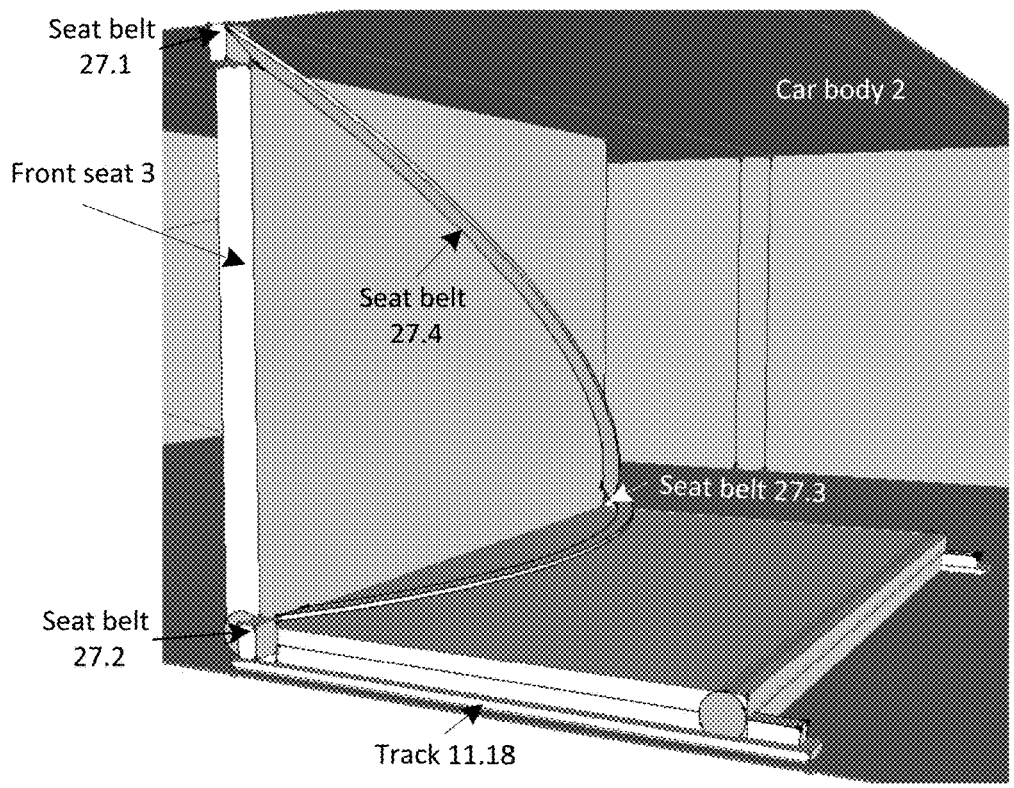
FIG. 18A is a representation of seat and seat belt in the current art.
Figure 18B:
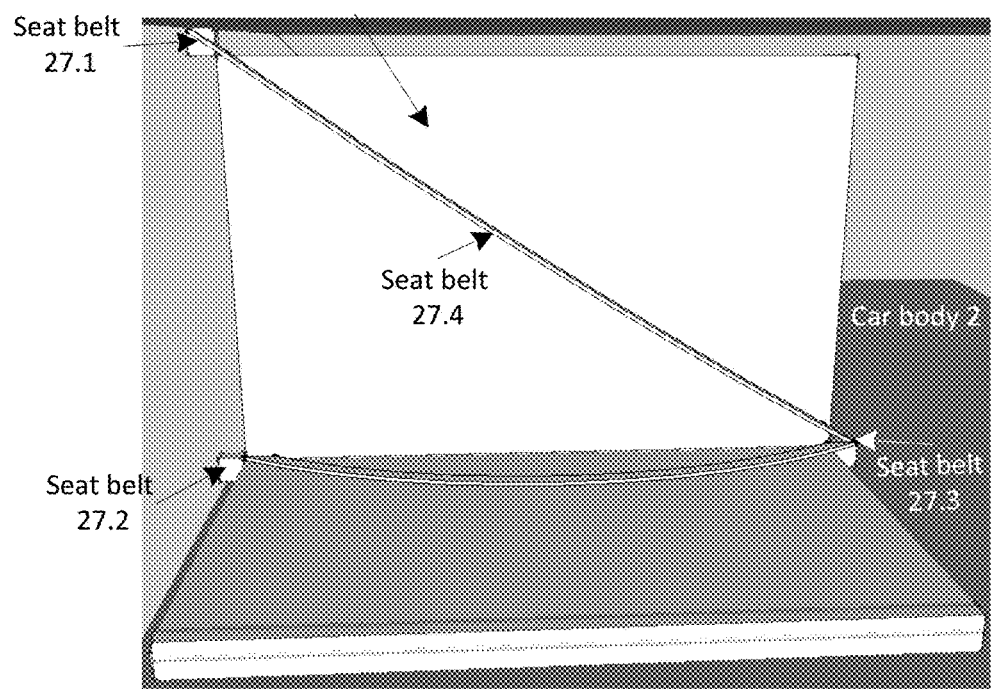
FIG. 18B is a representation of seat and seat belt in the current art.

FIGS. 18A and 18B are representative illustrations of vehicle seats 3 or 4 currently used in the art, for comparison with the present invention, particularly with regards to seat belts 27. FIGS. 18A and 18B are identical but have different viewpoints. In the present art, at least one seat belt connection point must be directly connected to the car body 2 for passenger safety; this is usually the "top" component 27.1 in the embodiment shown (i.e., where there are three connection points). Each "side" seat belt component 27.2 and 27.3 may be connected to either the car body 2 or the seat itself 3, depending on the design and safety constraints of the vehicle. Furthermore, in the current art, seat 3 is attached to the car body 2 via at least one track 11.18, which allows the seat 3 to move in multiple directions for the passenger. Therefore, any seat belt connection 27 which is attached to the seat 3 is only indirectly connected to the car body 2 through at least one mechanism, reducing safety and increasing complexity. In FIG. 18, seat belt component 27.4 connects the three components to safely restrain the passenger. In any other embodiment, such as when there are only two seat belt connection points (such as in a rear or middle seat 4), at least one connection point is still connected directly to the car body 2. In the current art, the track and seat must be modified to account for any additional options, such as particular movement in any specific direction or change in seat parameters (such as adjustable lumbar support as known in the art).

FIGS. 19A and 19B illustrate the present invention in comparison to the current art in FIGS. 18A and 18B. The hatched pattern across the entire seat 3 or 4 represents a seat which is translucent or transparent so that when the rear seat 4 is in courier mode with a non-autonomous driver, the driver may still be able to see through the rear-view mirror (as known in the art) despite the seat 4 being in a raised position that would otherwise prevent viewing access through the rear of the vehicle (i.e., rear window). Depending on the embodiment of the present invention, the entire seat 4 may be translucent or transparent, or just the seat back 4.1, or just bottom 4.2, whichever is required for rear viewing for the driver.

The present invention of the upper trunk 5 also includes the same option for transparent or translucent sections (preferably made from glass or plastic known in the art), preferably at least one section, specifically preferred at least two sections (such as upper trunk sections 5.1 and 5.2), and particularly preferred at least three sections (such as upper trunk sections 5.1-5.3) of the upper trunk 5. In lieu of transparent or translucent sections of either trunk 5 or seat 4, cameras known in the art provide alternative methods to emulate the rear-view traditionally achieved through a rear-view mirror (when the vehicle is operated in a non-autonomous driver mode).

Because the seat chassis 23 is directly connected to the car body 2 via at least two connection points, rather than the seat belt connections 27 being connected to a location external to the seat 3, the seat belt connections 27 may be directly connected to the seat chassis 23 as clearly shown within FIGS. 16A and 16B. This provides additional safety since all three seat belt connection points 27 can be connected to the seat 3 and to the car body 2 at the same time. This also minimizes the amount of interference of the seat belt system 27 with the rest of the car components, the seat 3, and/or the passenger since it is connected to the seat 3 itself and thus moves when the passenger moves (unlike in the current art, where it is stationary relative to the car body 2 and moves relative to the person, which may increase discomfort of the passenger and/or decrease safety in the event of an accident, particularly at high speeds). It is an object of the invention such that the seat belt connections 27 are void of cargo/boxes 20 interference points (i.e., seat belt connections 27 are solely to the seat chassis 23 (not shown in this figure) and not directly to the car body 2 and the seat chassis 23 is then in structural communication to the car body 2 chassis via seat hinges 26 that rotate during the transition between modes (i.e., driving and courier) when in the courier mode.

It is further an object of the invention such that the loading/unloading of cargo/boxes 20 is void of interference from all seat belt connections 27.

FIG. 20 illustrates an alternate position of seat suspension 24 relative to the seat chassis 23. The seat suspension back 24.1 is shown at an angle as compared to that shown in the previous figures. The position of the seat chassis 23 relative to car body 2 (e.g., 2' from the dashboard 14) and the position of seat suspension 24 components relative to seat chassis 23 (e.g., 10 degree angle of the seat suspension back 24.1) is a memory setpoint and/or configurable parameter for at least one of the each passenger or driver. In the embodiment shown in previous drawings where the passenger and driver seats are connected, the position is determined by a non-autonomous driver. In the embodiment shown in FIG. 15, each chair 3 or 4 may operate independently from each other.

Figure 21:
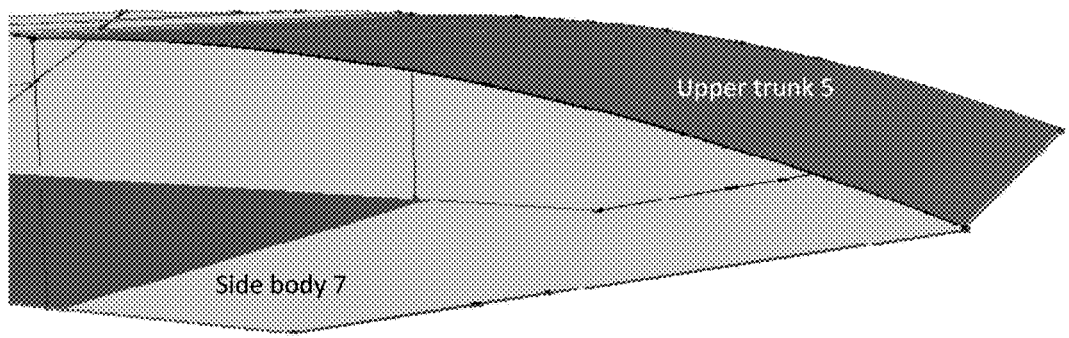
FIG. 21 is an illustration of another embodiment of the upper trunk in extended mode.

FIG. 21 illustrates another embodiment of the upper trunk 5. Instead of being completely flat as shown in previous figures, upper trunk 5 maintains a convex shape while in the extended mode to increase aerodynamic efficiency of the car 1. The side body sections 7 maintain an identical convex edge to create an integral/complete seal with the upper trunk 5 as shown. Otherwise the embodiment is identical to within FIGS. 1A-1C. FIG. 21 illustrates the embodiment with the upper trunk 5 but it is identical for bottom trunk 6.

Figure 22A:
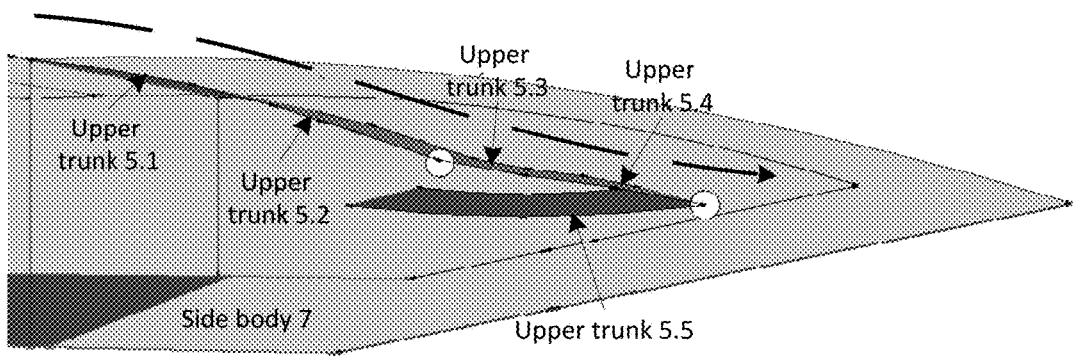
FIG. 22A is an illustration of another embodiment of collapsed mode.
Figure 22B:
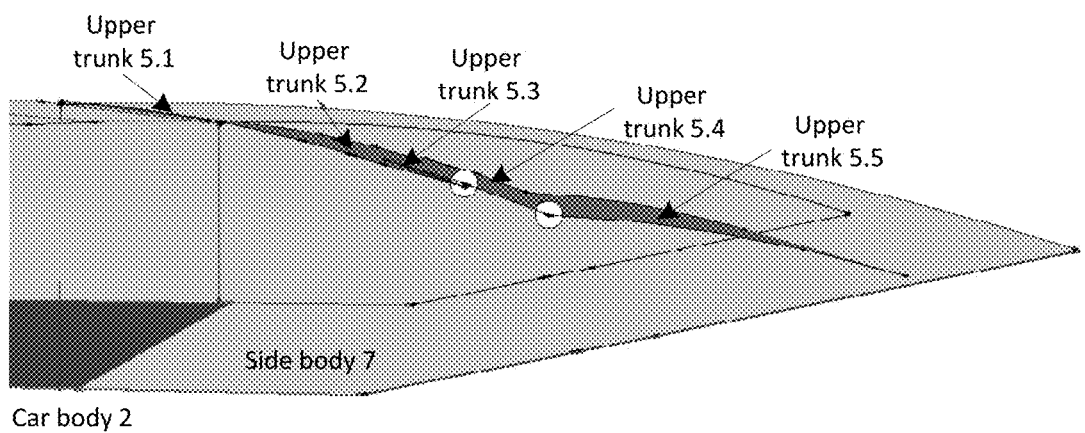
FIG. 22B is an illustration of another embodiment of collapsed mode.
Figure 22C:
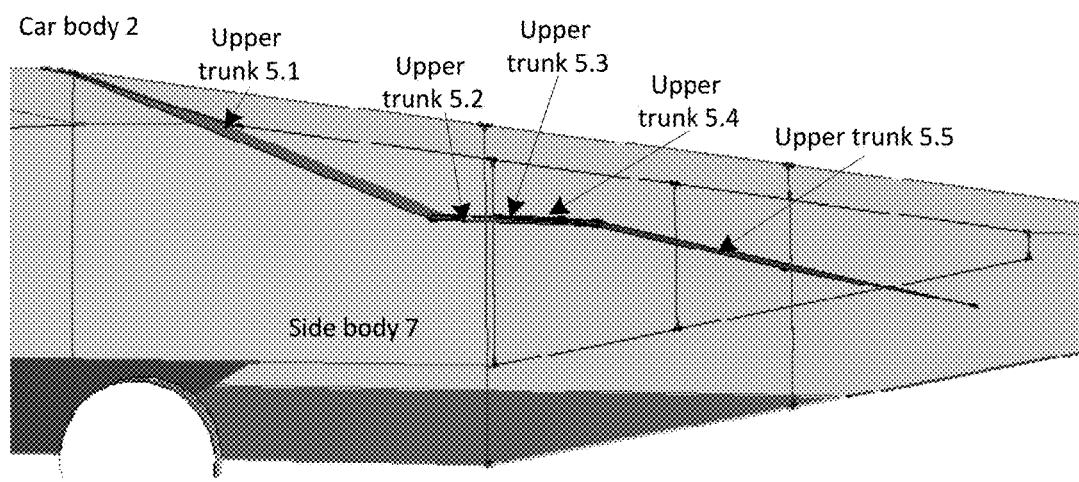
FIG. 22C is an illustration of another embodiment of collapsed mode.

FIGS. 22A, 22B, and 22C illustrate another embodiment for collapsed mode similar to FIG. 7C. FIG. 22A illustrates one embodiment using the upper trunk 5 shown in FIG. 21. The upper trunk 5.5 rotates preferably greater than 120 degrees, specifically preferred greater than 165 degrees, and particularly preferred greater than 180 degrees in order to shorten the trunk 5 length as compared to the non-rotated position. The upper trunk section 5.5 may lie towards the inside of the trunk space 21 or lie completely flush with the rest of the upper trunk 5.1-5.4 (such as when the angle of rotation is equal to 180 degrees). In addition, upper trunk sections 5.1-5.4 change their angle from the positions shown in FIG. 21 to maintain an aerodynamic shape when in collapsed mode. Each upper trunk section 5.1-5.4 independently changes angle preferably greater than 15 degrees, specifically preferred greater than 30 degrees, and particularly preferred greater than 45 degrees in either vertical up or down direction.

In this embodiment, actuators are located between upper trunk sections 5.2 and 5.3 and between sections 5.4 and 5.5 as shown in previous figures. The placement of the actuators as shown maintains the most flexibility for manipulating the upper trunk 5 shape. Since each actuator can manipulate the angle and positions of the trunk sections on either side, the locations as shown manipulate the upper trunk sections 5.2-5.5, while the trunk hinges 17 as shown in FIGS. 4A-4C manipulate the angle of upper trunk section 5.1.

FIG. 22B illustrates another embodiment of collapsed mode for the embodiment of upper trunk 5 shown in FIG. 21. In this embodiment, the upper trunk sections 5.2-5.4 overlaps in an identical manner to that shown in FIGS. 7A, 7B, 7C, and 7F. However in addition to overlapping, the angle of each upper trunk section 5.1-5.5 also alters the vertical direction up or down in order to optimize/maintain an aerodynamic shape for efficiency as shown.

FIG. 22C is identical to FIG. 22B except that the upper trunk 5 is identical to that shown in FIG. 1A, i.e., completely flat rather than the curved aerodynamic shape shown in FIG. 22A. The embodiments shown in FIGS. 21 22A, 22B, and 22C are identical when applied to lower trunk 6.

The collapsed mode as shown in FIGS. 1A, 1B, and 1C, FIG. 21, FIG. 7A, and FIGS. 22A, 22B, and 22C provide at least two and preferably three aerodynamic driving positions (either in courier or passenger mode) supported by car body 2, upper trunk 5, and upper trunk 6.

Figure 23A:
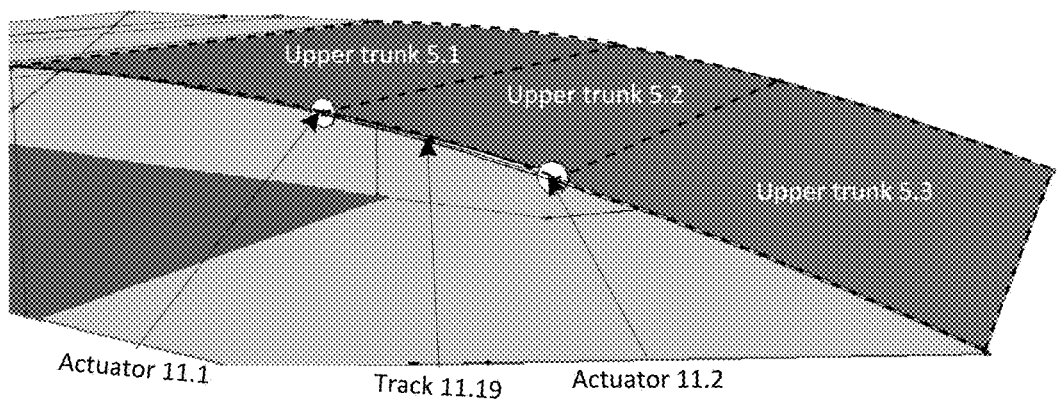
FIG. 23A is an illustration of another embodiment with a convex shape trunk.
Figure 23B:
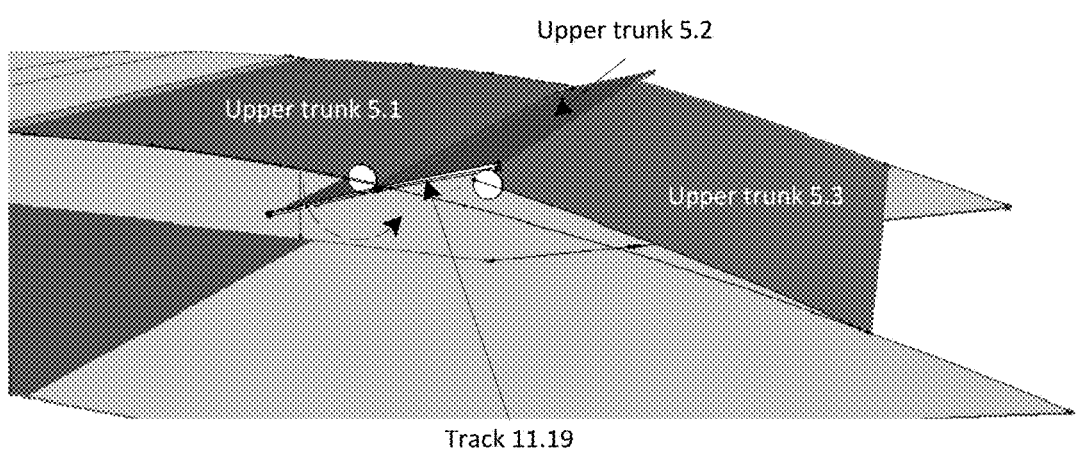
FIG. 23B is an illustration of the movement from convex position to concave.
Figure 23C:
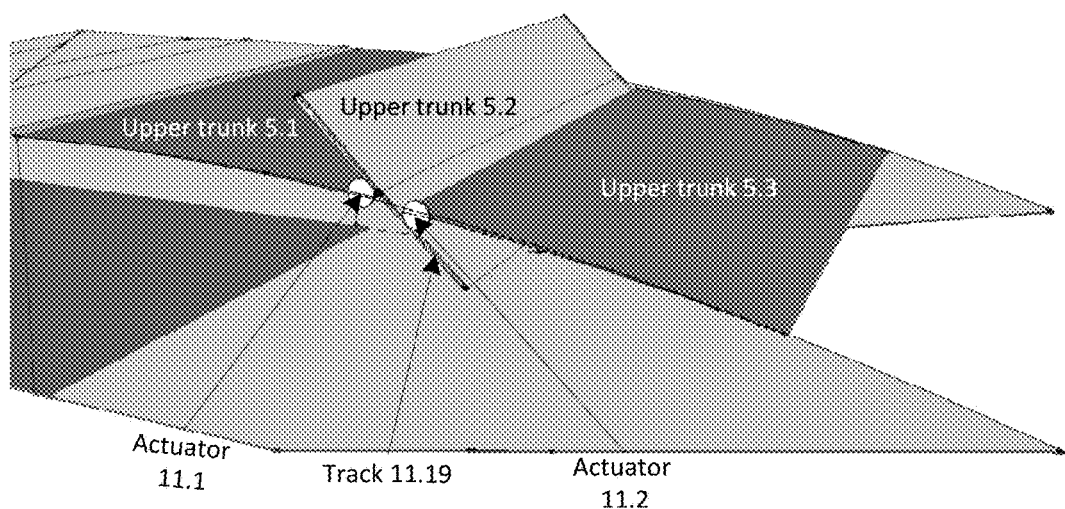
FIG. 23C is an illustration of the movement from convex position to concave.
Figure 23D:
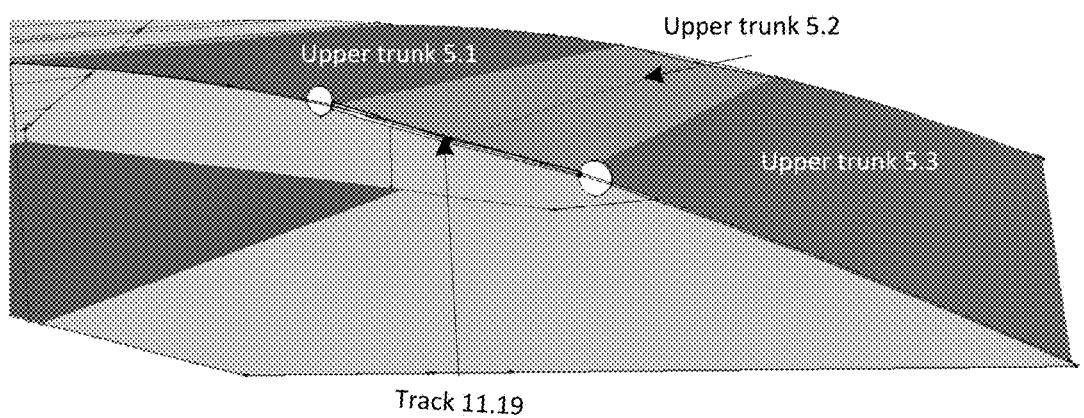
FIG. 23D is an illustration of the trunk with at least one section in concave position.

FIG. 23D illustrates another embodiment of the present invention wherein at least one upper trunk 5 section inverts from a convex to concave shape. In FIG. 23A, upper trunk 5 is made of three sections, upper trunk 5.1, 5.2 and 5.3, each outlined by the dotted lines. Actuator 11.1 is located between upper trunk 5.1 and 5.2, while actuator 11.2 is located between upper trunk 5.2 and 5.3, and they travel along track 11.19 as shown in subsequent figures. Optionally, at least one portion on the upper trunk 5, for example the very end edge of trunk section 5.2 as shown in the figures, remains attached to the car body 2 along a track or grooves (shown by the outline of car body 2) to add structural integrity (i.e., in structural communication with) and reliability to the system.

FIG. 23B shows a first step in the transition between concave and convex mode, wherein the actuators 11.1 and 11.2 travel along track 11.19 to rotate upper trunk section 5.2. FIG. 23C illustrates a second step in the transition mode as actuators 11.1 and 11.2 continue to travel along track 11.19 to rotate upper trunk section 5.2. FIG. 23D illustrates the final step of upper trunk section 5.2 in a concave position. This provides an opportunity to increase aerodynamic efficiency when the increased space of a convex position is not necessary, for example when there are few or no boxes/packages 20 present.

Figure 24A:
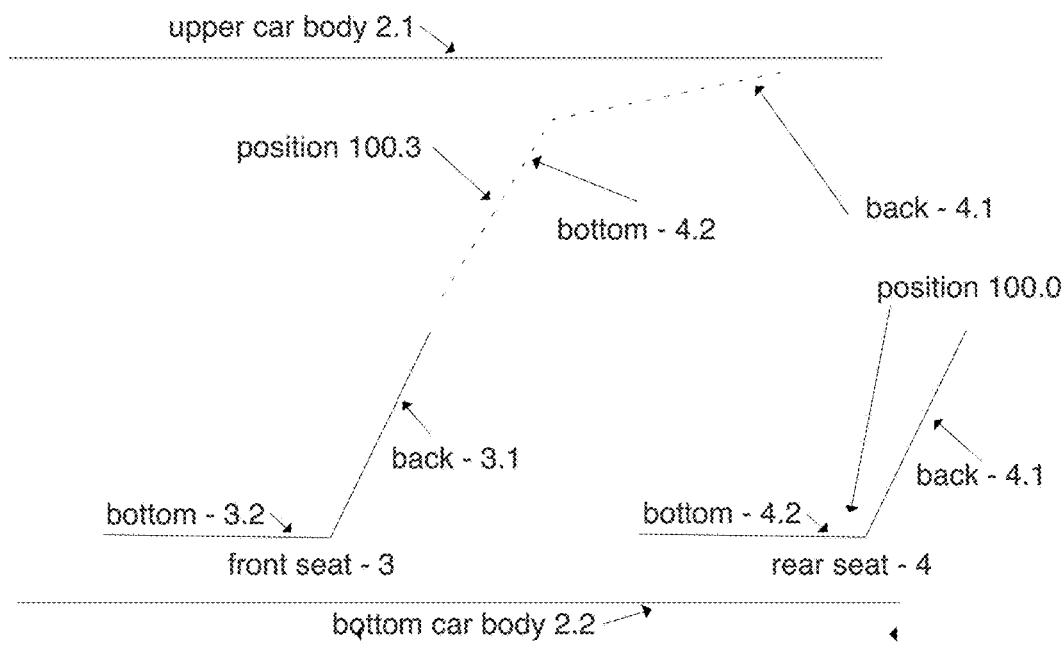
FIG. 24A is an illustration with a detailed view of another embodiment of the rear seat.

FIG. 24A shows a baseline position 100.0 of the rear seat 4 relative to the bottom car body 2.2 and upper car body 2.1. This particularly shows a front seat 3 and rear seat 4 where the respective seats are comprised of standard car seat structures, particularly not translucent suspension laminate seat structures where the lack of translucency or transparency needs to limit the height of the seat back to be lower than the upper car body 2.1 height. The rear seat 4 at position 100.3 specifically prevents/limits access behind the front seat 3 by having the combination of front seat 3 and rear seat 4 positions creating an effective barrier (i.e., limited access to boxes 20). The front seat 3 is comprised of a seat bottom 3.2 and a seat back 3.1 identical to other figures, where the other figures also depict the hinge between the seat bottom 3.2 and seat back 3.1.

Figure 24B:
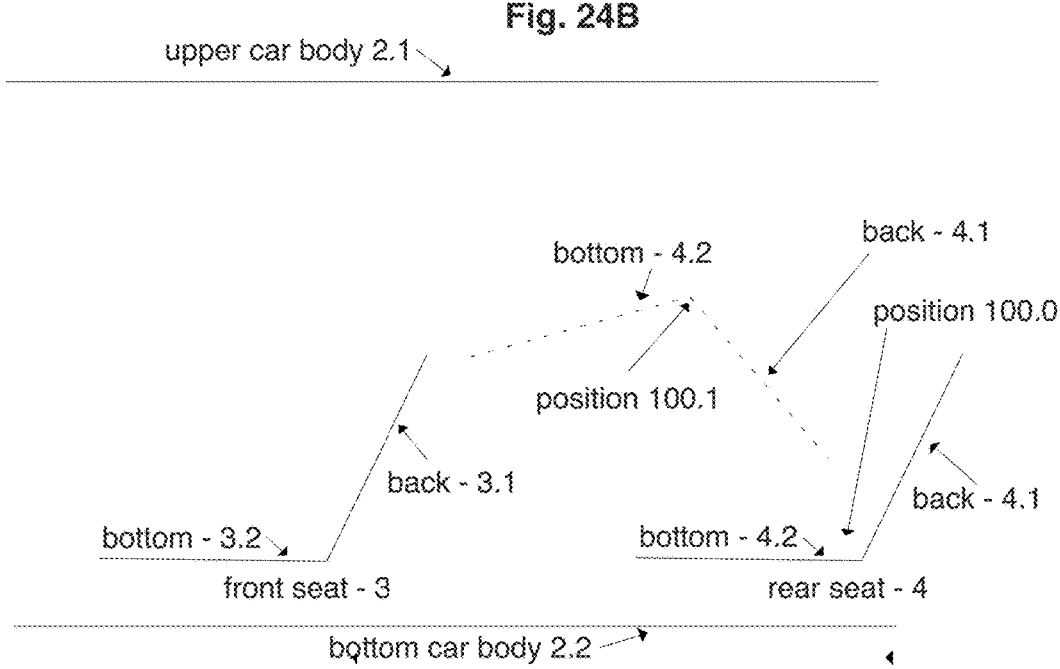
FIG. 24B is an illustration with a detailed view of another embodiment of the rear seat.

FIG. 24B is identical to FIG. 24A except for depicting an alternative position 100.1 creating an effective barrier (i.e., at least a reduction of space to preferably less than 80% of the volume of a box 20, specifically preferred to less than 50% of the volume of a box 20, though not a complete barrier. This alternative position 100.1 does not limit visibility through a presumably rear-window indirectly through a rear-view mirror (both typical within a standard present car body). For clarity, all depictions of front seat 3 and rear seat 4 in other figures show the seat backs respectively 3.1 and 4.1 in close proximity to the car body 2 (upper portion i.e., car body roof), but could equally be shown with a lower seat back height substantially lower than the car body roof height.

Figure 25:
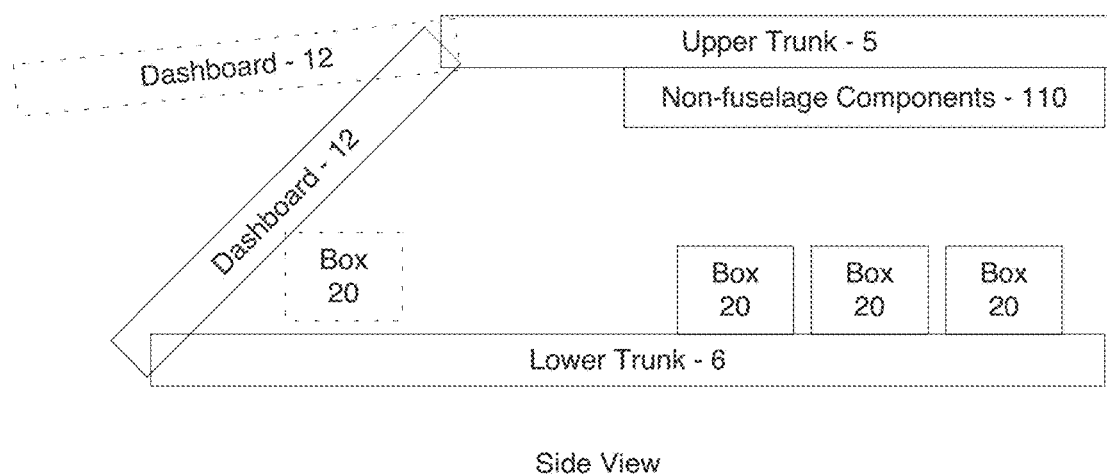
FIG. 25 is an illustration of the side view of the vehicle depicting the placement of boxes and non-fuselage components relative to the vehicle chassis.

FIG. 25 illustrates a detailed side view of the vehicle chassis, though only illustrative of non-fuselage components 110 in structural communications with the upper trunk 5. The non-fuselage components 110 do not interfere (i.e., void of box interference points) with the movement of boxes 20 at any stage of operation, particularly for the frontal loading/ unloading courier mode. It is evident from the figure that the dashboard 12 can be raised (preferentially as noted by the dashed representation of the dashboard 12) to eliminate box interference. It is a fundamental object of the invention such that the boxes 20 are in physical/structural contact with the lower trunk 6, such that boxes 20 are not obstructed during frontal (and rear) loading/unloading and thus non-fuselage components are in structural communication with only upper trunk 5 and center interior core 120. The center interior core 120 also serves a secondary function of being an at least partial privacy barrier for passengers such that at least 10% of the height between the lower trunk 6 and the upper trunk 5 is the height of the center interior core 120, a desired feature in a shared-vehicle or ride-sharing function where passengers are significantly less likely to know each other (therefore, the often desirable benefit of reduced physical barrier between passengers in traditional non-shared vehicles, is no longer an advantage). The preferred height of the center interior core 120, though only in the event of needing it for containment of non-fuselage components 110 (not shown as being within the center interior core 120, but the core purpose of the core 120) is at least 10% of the box 20 height. The particularly preferred height of the center interior core 120 is at least 50% of the box 20 height when the distance between the lower trunk 6 and the upper trunk 5 is less than 2 box 20 height, or is at least 125% of the box 20 height when the distance between the lower trunk 6 and upper trunk 5 is at least 2 box 20 heights. Though not depicted in this figure, it is understood that a center interior core (120 FIG. 26) typical of where the transmission "bump" is within a vehicle) can be present in the invention such that boxes 20 are still able to enter from the front and leave the back of the vehicle unencumbered (i.e., the boxes are interior-facing of the fuselage storage 18.1 and 18.2, and exterior-facing of the central interior core 120). The ideal usage of the center interior core 120 (at least when necessary within the passenger/driver occupied space), when required due to non-fuselage components necessity, is the placement of HVAC air handling (e.g., evaporator, heater, and/or air to fresh air heat exchanger) and/or battery storage due to relative silence of these components and the secondary benefit of enabling increased individual passenger climate control. The bottom line is that the moving dashboard 12 (FIG. 1A), and the upper front trunk 5-b (FIG. 9A) into their courier loading mode is void of box 20 interference points for both loading/unloading actions. The preferred width of the center interior core 120 is at least 1 inch less than the distance between the interior facing side of the left and right fuselage storage (18.2 and 18.1) minus the width of 2 box 20 widths. It is a further object of the invention to have fuselage components 19.1 and 19.2 towards the perimeter of the vehicle and in a stacked vertical orientation when insufficient space would otherwise impinge on box 20 storage and/or loading/unloading. To that end, non-fuselage components are preferably in structural communication with the upper trunk 5 and not the lower trunk 6. At least 20% of the non-fuselage components 110 are in structural communication with the upper trunk 5, preferably 50% of the non-fuselage components 110 are in structural communication with the upper trunk 5, particular preference is that 80% of the non-fuselage components 110 are in structural communication with the upper trunk 5, and specific preference is that over 90% of the non-fuselage components 110 are in structural communication with the upper trunk 5 while the balance of the non-fuselage components are preferably within the central interior core 120 all as depicted in FIG. 26.

Figure 26:
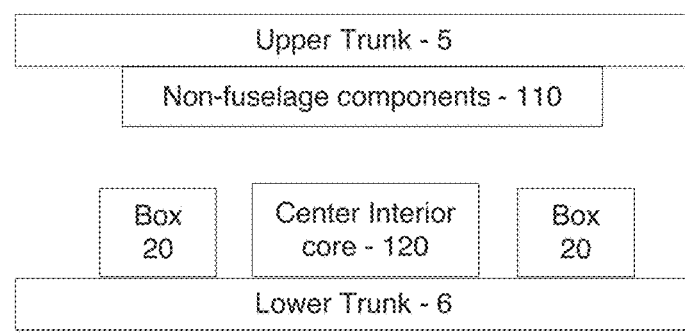
FIG. 26 is an illustration of the frontal view of the vehicle depicting the placement of boxes and non-fuselage components relative to the vehicle chassis including the center interior core.

FIG. 26 illustrates a frontal view of the transport vehicle chassis/body in the optimized placement, if necessary of primary vehicle components not contained within the fuselage storage (as depicted in other figures) referred to as non-fuselage components 110 in structural communication with the upper body panels or as depicted the upper trunk 5. Non-fuselage components 110, though not shown in this figure, are alternatively (and preferentially) within the center interior core 120. It is clearly depicted in this figure that adequate space (i.e., width) is available such that at least one box 20 is able to be located on both exterior facing sides of the center interior core 120 and the outer width of the lower trunk 6.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A dynamically reconfigurable transport vehicle comprised of:
   a trunk space as formed between an upper trunk panel, a bottom trunk panel and a side body panel;
   an at least one box within the trunk space;
   an at least one upper structural actuator in structural connectivity with the dynamically reconfigurable transport vehicle and the upper trunk panel;
   an at least one reconfigurable seat having a seat chassis in structural connectivity with the dynamically reconfigurable transport vehicle and an at least one seat actuator whereby the at least one reconfigurable seat is in structural connectivity with both the at least one upper structural actuator and the at least one seat actuator; and
   a segmented panel selected from at least one panel of the upper trunk panel, the bottom trunk panel or the side body panel whereby the segmented panel reconfigures to vary the trunk space and wherein the segmented panel or the at least one reconfigurable seat moves to a position void of an obstruction during the loading or unloading of the at least one box within the trunk space.

2. The dynamically reconfigurable transport vehicle according to claim 1 whereby the dynamically reconfigurable transport vehicle has a front portion and a rear portion, whereby the side body panel is further comprised of a hinge in structural connectivity with the lower trunk panel; and wherein the hinge enables a movement of the side body panel in a vertical orientation swinging up, a horizontal orientation swinging inward or outward, or in both the vertical orientation and the horizontal orientation.

3. The dynamically reconfigurable transport vehicle according to claim 1 whereby the at least one reconfigurable seat is dynamically reconfigured to an upward stowable position to increase the trunk space or to remove an obstruction for removal of the at least one box from the trunk space.

4. The dynamically reconfigurable transport vehicle according to claim 1 further comprised of an at least one courier shelf securing the at least one box, wherein the at least one box has a box height, wherein the at least one courier shelf is in structural communication with the seat chassis and wherein the at least one reconfigurable seat when dynamically reconfigured to an upward stowable position concurrently retracts inward the at least one courier shelf.

5. The dynamically reconfigurable transport vehicle according to claim 4 whereby the at least one courier shelf is comprised of a lower courier shelf and an upper courier shelf, wherein a loading sequence method for the at least one box within the trunk space is a first step of loading the upper courier shelf when the upper courier shelf is directly on the lower courier shelf and when the lower courier shelf is void of the at least one box, a second step of loading the at least one box when the upper courier shelf with the at least one box is raised to a height greater than the box height, and a third step of loading the at least one box on the lower courier shelf.

6. The dynamically reconfigurable transport vehicle according to claim 4 is further comprised of a track guide for the at least one box wherein the track guide is in structural communication with the at least one courier shelf, whereby the track guide is a structural element of the at least one courier shelf and a guide for loading or unloading of the at least one box, and whereby the track guide is optionally a locking mechanism to secure the at least one box.

7. The dynamically reconfigurable transport vehicle according to claim 3 whereby the at least one reconfigurable seat is comprised of a flexible suspension laminate having a woven base of interwoven filaments, whereby the seat chassis has a pair of rails, and whereby the flexible suspension laminate is suspended between the pair of rails.

8. The dynamically reconfigurable transport vehicle according to claim 7 whereby the at least one reconfigurable seat is further comprised of an integral cross member, a side support, and a high load member.

9. The dynamically reconfigurable transport vehicle according to claim 7 whereby the seat chassis is further comprised of an at least two seat chassis hinges and at least one actuator arm, and whereby the at least one of the at least two seat chassis hinges is in structural communication with the upper trunk panel.

10. The dynamically reconfigurable transport vehicle according to claim 7 whereby the seat chassis is further comprised of an at least two seat chassis hinges and at least one actuator arm, whereby the at least two seat chassis hinges are in structural communication with the upper trunk panel either directly or indirectly through the at least one actuator arm.

11. The dynamically reconfigurable transport vehicle according to claim 1 wherein the at least one box in the trunk space has a box smallest side area, whereby the at least one reconfigurable seat is comprised of a first seat in a seat use position and a second seat that is parallel with the the first seat wherein the second seat is an upward stowable position, whereby the trunk space is behind the second seat, whereby the second seat position reduces access to the at least one box in the trunk space by at least 80% of the box smallest side area from the first seat.

12. A dynamically reconfigurable transport vehicle comprised of:
   a trunk space as formed between an upper trunk front panel, a lower front trunk panel and a side body panel;
   an at least one box within the trunk space;
   an at least one upper structural actuator in structural connectivity with the dynamically reconfigurable transport vehicle and the upper trunk front panel;
   an at least one reconfigurable seat having an upward stowable seat position;
   an upward stowable dashboard; and
   wherein the at least one reconfigurable seat in the upward stowable seat position and the upward stowable dashboard in an upward stowable dashboard position is a position void of an obstruction during the loading or unloading of the at least one box within the trunk space.

* * * * *